United States Patent
Wenzel

(10) Patent No.: US 8,261,125 B2
(45) Date of Patent: *Sep. 4, 2012

(54) GLOBAL WRITE-LOG DEVICE FOR MANAGING WRITE LOGS OF NODES OF A CLUSTER STORAGE SYSTEM

(75) Inventor: Thomas Rudolf Wenzel, Almere (NL)

(73) Assignee: Net App. Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/278,947

(22) Filed: Oct. 21, 2011

(65) Prior Publication Data

US 2012/0042202 A1  Feb. 16, 2012

Related U.S. Application Data

(63) Continuation of application No. 12/432,404, filed on Apr. 29, 2009, now Pat. No. 8,069,366.

(51) Int. Cl.
*G06F 11/07* (2006.01)

(52) U.S. Cl. .......... 714/6.3; 714/4.11; 714/13; 711/147; 711/148; 709/213; 709/214

(58) Field of Classification Search .................... 714/6.3, 714/4.11, 13
See application file for complete search history.

(56) References Cited

U.S. PATENT DOCUMENTS

| | | | |
|---|---|---|---|
| 7,330,996 B2 | 2/2008 | Coteus et al. | |
| 7,392,302 B2 | 6/2008 | Halpern | |
| 7,430,568 B1* | 9/2008 | DeKoning et al. | ..................... 1/1 |
| 7,523,341 B2 | 4/2009 | Hufferd et al. | |
| 8,069,366 B1 | 11/2011 | Wenzel | |
| 2003/0135782 A1 | 7/2003 | Matsunami et al. | |
| 2004/0030668 A1* | 2/2004 | Pawlowski et al. | ............... 707/1 |
| 2004/0181707 A1 | 9/2004 | Fujibayashi | |
| 2006/0036896 A1* | 2/2006 | Gamache et al. | ................. 714/4 |
| 2006/0117212 A1 | 6/2006 | Meyer et al. | |
| 2007/0168693 A1* | 7/2007 | Pittman | ............................. 714/4 |
| 2009/0024868 A1 | 1/2009 | Joshi et al. | |
| 2009/0276771 A1* | 11/2009 | Nickolov et al. | ............. 717/177 |
| 2010/0107158 A1* | 4/2010 | Chen et al. | ......................... 718/1 |
| 2010/0153617 A1* | 6/2010 | Miroshnichenko et al. | ...... 711/6 |
| 2011/0078490 A1 | 3/2011 | He et al. | |
| 2011/0296000 A1* | 12/2011 | Ferris et al. | .................... 709/224 |

OTHER PUBLICATIONS

Office Action dated Oct. 13, 2011 issued by the USPTO for U.S. Appl. No. 12/401,458.

* cited by examiner

*Primary Examiner* — Chae Ko

(74) *Attorney, Agent, or Firm* — Stattler-Suh PC

(57) ABSTRACT

A cluster system comprises a plurality of nodes that provides data-access service to a shared storage, each node having at least one failover partner node for taking over services of a node if the node fails. Each node may produce write logs for the shared storage and periodically send write logs at predetermined time intervals to a global device which stores write logs from each node. The global device may detect failure of a node by monitoring time intervals of when write logs are received from each node. Upon detection of a node failure, the global device may provide the write logs of the failed node to one or more partner nodes for performing the write logs on the shared storage. Write logs may be transmitted only between nodes and the global device to reduce data exchanges between nodes and conserving I/O resources of the nodes.

20 Claims, 20 Drawing Sheets

GLOBAL WRITE-LOG DEVICE FOR MANAGING WRITE LOGS OF NODES OF A CLUSTER STORAGE SYSTEM

RELATED APPLICATIONS

This patent application claims benefit to and is a continuation of the U.S. patent application entitled "Global Write-Log Device for Managing Write Logs of Nodes of a Cluster Storage System," having Ser. No. 12/432,404, filed on Apr. 29, 2009 now U.S. Pat. No. 8,069,366.

FIELD OF THE INVENTION

The present invention relates to networked storage systems, and particularly, to managing write logs of nodes of a cluster storage system using a global write-log device.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units (LUs). For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from NetApp, Inc. Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing access requests (read/write requests) as file-based and block-based protocol messages (in the form of packets) to the system over the network.

It is advantageous for the services and data provided by a storage system, such as a storage node, to be available for access to the greatest degree possible. Accordingly, some storage systems provide storage system nodes interconnected as a cluster, with a first storage system node being clustered with a second storage system node to provide high availability of data access. Each node of the cluster may include (i) a storage server (referred to as a "D-module") adapted to service particular aggregate(s) or volume(s) and (ii) a multi-protocol engine (referred to as an "N-module") adapted to redirect the data access requests to any storage server of the cluster. In the illustrative embodiment, the storage server of each node is embodied as a disk element (D-module) and the multi-protocol engine is embodied as a network element (N-module). The N-module receives a multi-protocol data access request from a client, converts that access request into a cluster fabric (CF) message and redirects the message to an appropriate D-module of the cluster.

The nodes of the cluster may be configured to communicate with one another to act collectively to increase performance or to offset any single node failure within the cluster. Each node in the cluster may have a predetermined failover "partner" node. When a node failure occurs (where the failed node is no longer capable of processing access requests for clients), the partner node of the failed node may "takeover" the data services of the failed node. In doing so, access requests sent to the failed node may be re-directed to the partner node for processing. As such, the cluster may be configured such that a partner node may take over the work load of a failed node. A node may be referred to as a local/primary node when referring to a current node being discussed, whereas a remote/partner node refers to a predetermined failover partner node of the local/primary node. As used herein, various components residing on the primary node may likewise be referred to as a local/primary component (e.g., local memory, local write-log layer, etc.) and various components residing on a remote node may likewise be referred to as a remote component (e.g., remote memory, remote write-log layer, etc.).

The shared storage may comprise a plurality of aggregates, where each aggregate may be configured to contain one or more volumes. The volumes may be configured to store content of data containers, such as files and logical units, served by the cluster in response to multi-protocol data access requests issued by clients. Each node of a cluster may "own" an assigned predetermined set of aggregates (aggregate set) within the shared storage, whereby only the assigned node is configured to service data for the predetermined aggregate set during normal operating conditions (when no node has failed). However, upon failure of a node, "ownership" of the entire aggregate set of the failed node may be transferred to the partner node (so that servicing of data for the entire aggregate set of the failed node may be taken over by the partner node). As such, a cluster may be configured such that a partner node may takeover the work load of a failed primary node where the partner node assumes the tasks of processing and handling any data access requests normally processed by the failed primary node.

Each node of a cluster provides data-access service to clients by providing access to shared storage (comprising a set of storage devices). Typically, clients will connect with a node of the cluster for data-access sessions with the node. During a data-access session with a node, a client may submit access requests (read/write requests) that are received and performed by the node. For the received write requests, the node may produce write logs that represent the write requests and locally store the write logs to a local memory device (from which, the node may at a later time perform the write logs on the storage devices). To ensure data consistency, the write logs of a primary node may also be periodically sent/transmitted to the partner nodes in the cluster for remote storage at the partner nodes. As such, if the local/primary node fails, a remote/partner node will have a copy of the write logs and will still be able to perform the write logs on the shared storage.

However, as cluster storage systems become larger and contain more nodes, whereby each primary node in the cluster has more partner nodes, the transmission and remote storage of write logs may consume valuable storage space and I/O resources of the nodes in the cluster. For example, if a cluster has four nodes (whereby each primary node has three failover partner nodes), each node may locally store its own write logs and the write logs of each of the three partner nodes. As such, as the number of nodes in the cluster increases, the amount of storage space at each node required to store the write logs of the partner nodes increases as well. Also, since write logs are periodically sent to each partner node, the number of write log data exchanges (sending and receiving) between the nodes of a cluster increases with each node added to the cluster. This may consume significant I/O resources of the nodes in the cluster. As such, an improved method for managing write logs of a cluster storage system is needed.

SUMMARY OF THE INVENTION

In some embodiments, a cluster storage system comprises a plurality of nodes that access a set of storage devices (shared storage), each node having one or more predetermined failover partner nodes configured to takeover the workload of the node if the node fails. Each node may receive (from clients) write requests for the shared storage, produce write logs representing the write requests, and periodically send the write logs to a global write-log device. The global write-log device may be connected with each node in the cluster and receive and store write logs from each node. Upon detection of a failure of a node, the global write-log device may provide the write logs of the failed node to one or more failover partner nodes for performing the write logs on the shared storage. In some embodiments, the write logs may be transmitted only between the nodes and the global write-log device and is not transmitted between the nodes, thus reducing data exchanges between the nodes, and thus conserving I/O resources (receive/send operations) of the nodes. Also, in some embodiments, only upon failure of a node in the cluster storage system does a partner node receive or read write logs from the global write-log device. In some embodiments, the write logs of each node may be stored in the global write-log device rather than on partner nodes, thus reducing the amount of storage space in the nodes needed to store write logs.

In some embodiments, each node may be configured for periodically communicating/sending accumulated write logs to the global write-log device at time intervals determined by a predetermined time interval. The global write-log device may detect failure of a node by monitoring the time intervals of when write logs are received from each node in the cluster. The global write-log device may determine failure of a node if it has not received write logs from the node for a longer time period than the predetermined time interval (since the last time the global write-log device received write logs from the node). In some embodiments, the global write-log device may determine failure of a node if it has not received write logs from the node within a predetermined time threshold period that is approximately equal to or greater than the predetermined time interval to provide a buffer period before a node is determined as failed. By providing a centralized global device for managing write-logs of all nodes of the cluster, a new method of detecting failure of a node is also provided through monitoring of the write-logs received by the nodes. As such, the cluster storage system may forego other methods of node failure detection (e.g., use of heartbeat signal passed between the nodes, as discussed below).

In some embodiments, the global write-log device is external to each node in the cluster and is configured to operate independently from each node. The global write-log device may be configured for maintaining operation upon failure of any node or all nodes in the cluster storage system. In some embodiments, each node directly interacts with the global write-log device without requiring any operations of another node. As such, even if one or more nodes fail in the cluster, the global write-log device can still manage write logs of the cluster. In some embodiments, the global write-log device is a device dedicated to the management of the write logs of the nodes and is not configured to provide the functions of a node to provide data-access service to the shared storage. As such, the global write-log device may comprise a dedicated device that is less prone to operational failure than a node.

In some embodiments, the global write-log device may comprise a memory device that provides a storage space. The global write-log device may sub-dividing the storage space into at least one logical storage partition, each storage partition being assigned to a particular node in the cluster for storing write logs received from the particular node. Upon detection of failure of a node, the global write-log device may provide the write logs from the storage partition assigned to the primary node to at least one partner node of the failed node. For example, upon detection of the failure of the node, the global write-log device may send the write logs from the assigned partition to the at least one partner node or may allow access to the assigned partition to the at least one partner node for reading the write logs from the assigned partition.

In some embodiments, the global write-log device may comprise a global write-log management (GWLM) engine configured for performing the write-log management operations described herein. The GWLM engine may use and maintain write-log data structures for performing the write-log management operations described herein. In some embodiments, the write-log data structures may include an aggregate failover data structure (AFDS) that specifies which partner node is to take over which aggregates owned by a failed node. In these embodiments, a primary node may own/service an aggregate set in the shared storage and produce write logs for performing on the aggregate set. The global primary node may receive and store the write logs for the aggregate set from the primary node. The aggregate set may comprise a first aggregate sub-set and a second aggregate sub-set. The AFDS may specify a first partner node to take over the first aggregate sub-set and a second partner node to take over the second aggregate sub-set upon failure of the primary node. As such, upon detection of failure of the primary node, the GWLM engine provides the write logs of the failed node to the first and second partner nodes. The first partner node then receives and performs write logs only for the first aggregate sub-set and the second partner node receives and performs write logs only for the second aggregate sub-set.

In some embodiments, a cluster storage system comprises a shared storage and a plurality of sites that access the shared storage. Each site may comprise a plurality of nodes connected with a global write-log device, the global write-log device receiving write logs from each node at the site. The global write-log devices of the different sites may be connected for transmitting write logs between the global write-log devices. For example, a first global write-log device at a first site may transmit its write logs to a second global write-log device at a second site for remote storage of its write logs. Upon failure of a primary node at the first site, the second global write-log device may then provide the write logs of the primary node to a partner node at the second site, the partner node being configured to take over the data-access services of the primary node upon failure of the primary node. As such, by replicating write logs across different sites, failover protection of the primary node may be provided by a node at the first site (referred to as "local failover protection") as well as by a node at the second site (referred to as "remote failover protection"). As the sites may be geographically located at far distances from each other, a single connection between each global write-log device at each site may be more feasible than multiple connections between a global write-log device and multiple nodes located at far distances from the global write-log device.

As described above, by providing a centralized global write-log device for managing write-logs of all nodes of a cluster, data exchanges between nodes may be reduced data exchanges between the nodes (thus conserving I/O resources of the nodes). For example, in normal operation, write logs may be sent from nodes to only the global write-log device and only upon failure of a node in the cluster storage system does a node receive or read write logs from the global write-log device. Also, the write logs of the nodes may be stored in the global write-log device rather than on the nodes, thus reducing the amount of storage space in the nodes needed to store write logs. The global write-log device further provides a new method of detecting node failure by providing centralized monitoring of the write-logs received by the nodes. Global write-log devices connected between distant storage sites may also be used to provide local or remote protection for node failures.

DETAILED DESCRIPTION

The disclosure of U.S. patent application entitled "Global Write-Log Device for Managing Write Logs of Nodes of a Cluster Storage System," having Ser. No. 12/432,404, filed on Apr. 29, 2009, is expressly incorporated herein by reference.

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into seven sections. Section I describes a cluster environment in which some embodiments operate. Section II describes a storage operating system having a write-log module for producing write logs of received write requests. Section III describes a shared storage of the cluster. Section IV describes taking over of a node on a per aggregate basis. Section V describes managing write-logs of nodes of a cluster using a global write-log device. Section VI describes using global write-log devices at multiple storage sites. Section VII describes data structures and components of a global write-log device.

I. Cluster Environment

Figure 1A:
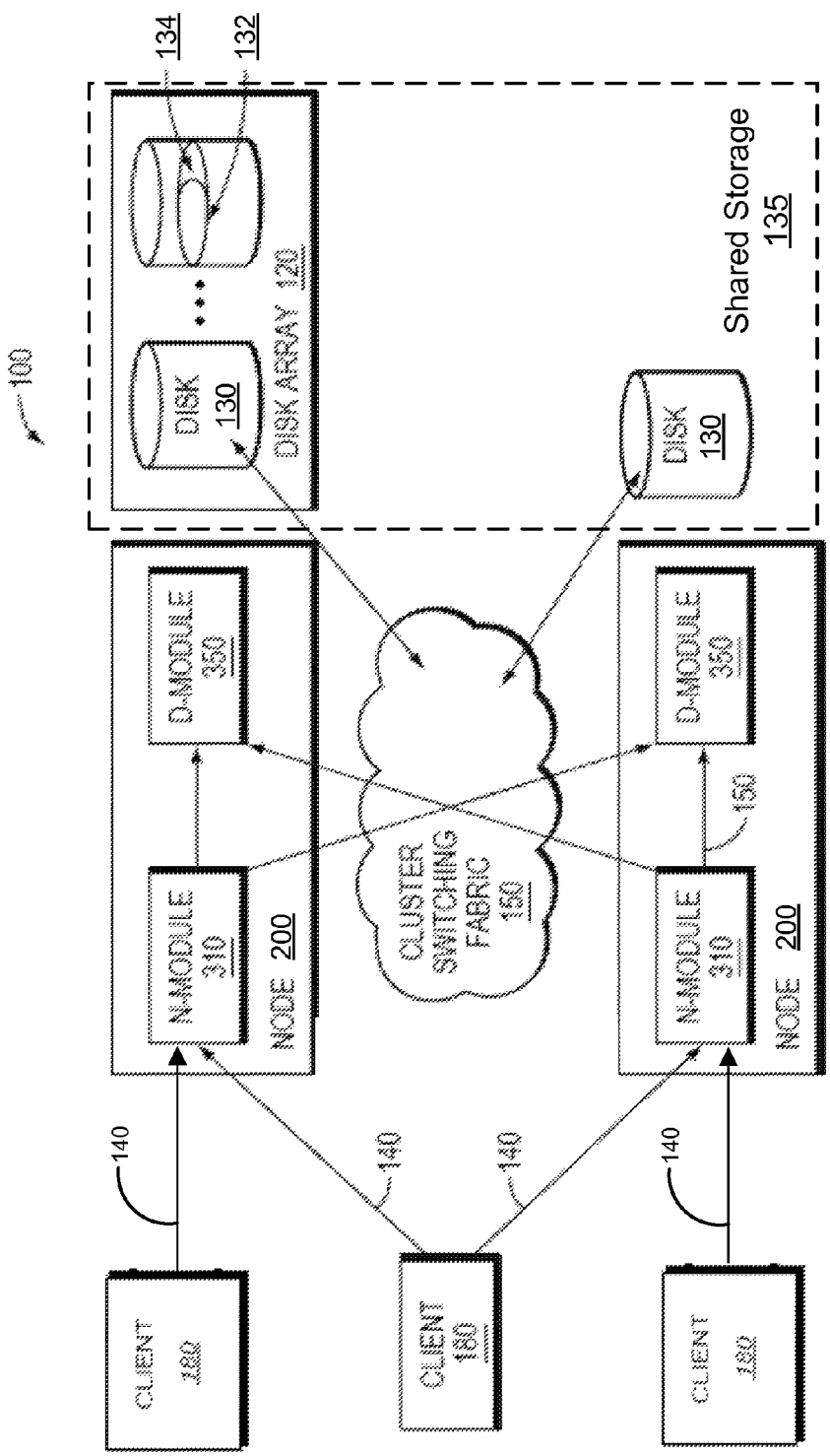
FIGS. 1A-B are schematic block diagrams of an exemplary cluster environment in which some embodiments operate.
Figure 1B:
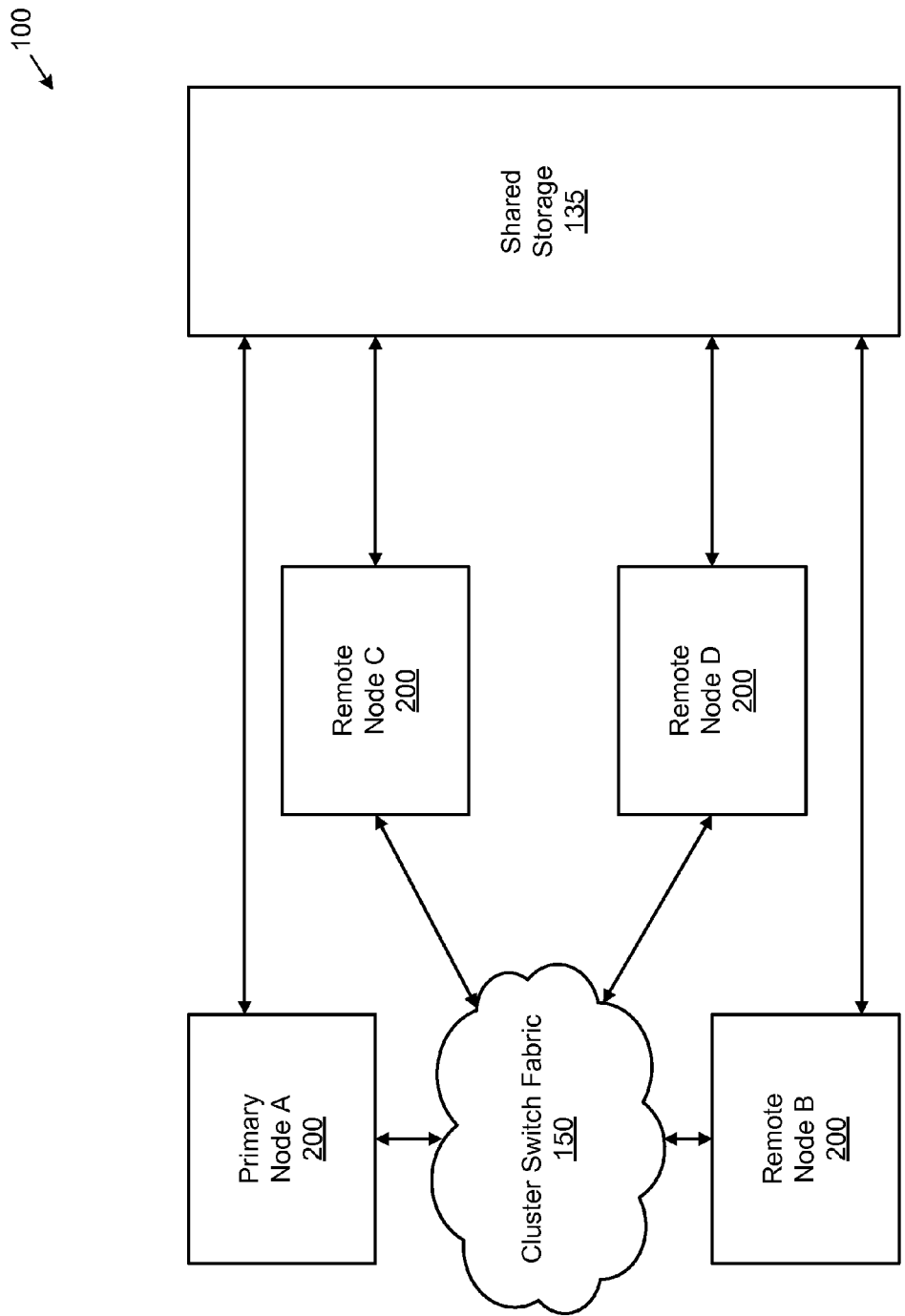

FIGS. 1A-B are schematic block diagrams of an exemplary cluster 100 environment in which some embodiments operate. A cluster 100 may comprise a plurality of interconnected nodes 200 configured to provide storage services for a set of storage devices comprising a shared storage 135. The nodes 200 may comprise various functional components that work in conjunction and cooperate to provide a distributed storage system architecture of the cluster 100.

As shown in FIG. 1A, each node 200 may be organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. It should be noted that although disks 130 are used in some embodiments described below, any other type of storage device may be used as well. For example, a solid state storage device may be used instead, the solid state device having no mechanical moving parts for reading and writing data. Some examples of solid state devices include flash memory, non-volatile random access memory (NVRAM), Magnetic Random Access Memory (MRAM), Phase Change RAM (PRAM), etc. In other embodiments, other storage devices other than those mentioned here may also be used.

Also, it should be noted that while there is shown an equal number of N and D-modules in the illustrative cluster 100, there may be differing numbers of N and/or D-modules, and/or different types of modules implemented in the cluster 100 in accordance with various embodiments. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only. For example, a node 200 may also have one N-module and a plurality of D-modules, a plurality of N-modules and one D-module, or a plurality of N-modules and a plurality of D-modules.

The nodes 200 are interconnected by a cluster switching fabric 150 which, in the illustrative embodiment, may be embodied as a Gigabit Ethernet switch. In other embodiments, the cluster switching fabric 150 may be embodied as another clustering network connection. An exemplary distributed file system architecture is generally described in U.S. Patent Application Publication No. US 2002/0116593, entitled METHOD AND SYSTEM FOR RESPONDING TO FILE SYSTEM REQUESTS, by M. Kazar et al. published Aug. 22, 2002.

In general, the nodes 200 in the cluster 100 may continually monitor each other to detect a failure of any node, e.g., by notifying one another of continued operation using a heartbeat signal passed between the nodes. If a partner node detects the absence of a heartbeat signal from a primary node, a failure is detected and a takeover procedure of the primary node may be initiated. In other embodiments, detection of node failure is provided by a global write-log device monitoring write logs received by nodes 200 in the cluster 100. In these embodiments, use of heartbeat signals for detecting node failure may be omitted. A failure of a node may be caused by a variety of reasons, such as a software failure (e.g., failure of the N-module or D-module) or hardware failure. Also, note that a node 200 "failure" may occur unintentionally or intentionally (e.g., where a node is taken offline for servicing by an administrator or a command to takeover a node is received from an administrator).

In general, the takeover of a node may be triggered/initiated for any variety of reasons. Upon detecting a node failure, takeover of ownership of the aggregates of a "failed" node may be initiated. As such, in the embodiments described below, a "failed" node may be construed broadly to include any node where takeover of the aggregates owned by the node is triggered/initiated (for whatever reason). In some embodiments, when a takeover procedure of a "failed" node is triggered/initiated, one or more partner nodes of the cluster 100 assert ownership of the aggregates owned by the failed node according to an aggregate failover data structure (AFDS). After the takeover operation is complete, the data in the aggregates previously owned by the failed node are served and serviced by the one or more partner nodes.

The clients 180 may be general-purpose computers configured to interact with the node 200 in accordance with a client/server model of information delivery. That is, each client 180 may request the services of the node 200 (e.g., by submitting read/write requests), and the node 200 may return the results of the services requested by the client 180, by exchanging packets over the network 140. The client 180 may submit access requests by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may submit access requests by issuing packets using block-based access protocols, such as the Small Computer Systems Interface (SCSI) protocol encapsulated over TCP (iSCSI) and SCSI encapsulated over Fibre Channel (FCP), when accessing information in the form of blocks.

In some embodiments, a client 180 connects to a node 200 for a data-access session with the node 200, the node providing data-access services. During a data-access session, the client 180 may submit access requests that are received and performed by the node 200. Such access requests may include storage state requests, a storage state request comprising a request that alters the data state of a storage device 130. Examples of storage state requests include requests for storing new data to a file, deleting a file, changing attributes of a file, etc. For illustrative purposes, storage state requests may be generically referred to herein as write requests.

In some embodiments, the totality of storage space provided by the disks 130 and disk arrays 120 of the cluster 100 comprise a total shared storage space (referred to as "shared storage 135") of the cluster 100. In other embodiments, the shared storage 135 comprises the totality of storage space provided by other types of storage devices (such as solid state storage devices). The shared storage 135 is accessible by each D-module 350 of each node 200 in the cluster 100. The shared storage 135 is discussed in detail in Section III. In some embodiments, the cluster 100 may provide high availability of service to clients 180 in accessing the shared storage 135. For example, the nodes 200 may be configured to communicate with one another (e.g., via cluster switching fabric 150) to act collectively to offset any single node 200 failure within the cluster 100. Each disk 130 in the shared storage 135 may store ownership information 132 at an on-disk ownership location 134. Ownership information 132 of a disk 130 may indicate which node or D-module within the cluster 100 has permission to access the disk 130 (i.e., "owns" the disk 130).

FIG. 1B shows an embodiment where a cluster 100 comprises three or more nodes, where each node 200 may have one or more predetermined failover partner nodes 200 (referred to as an "N-way system"). Each node 200 may have an associated identifier (ID) that uniquely identifies the node 200 within the cluster 100. Also, each D-module 350 may have an associated identifier (ID) that uniquely identifies the D-module 350 within the cluster 100. In some embodiments, the D-module ID of a D-module 350 may be the same as the node ID of the node in which the D-module 350 resides.

Each node is configured for providing data-access service to clients connected with the node. When a node 200 failure occurs (where the failed node is no longer capable of processing access requests for clients 180), the one or more partner nodes 200 are configured to automatically resume/takeover the data-access service functions provided by the failed node 200. As such, when a node failure occurs, access requests sent to the failed node 200 may be re-directed to the one or more partner nodes 200 for processing and execution.

As opposed to each node 200 having only a single partner node 200 where the entire additional workload (of the failed node) is imposed on a single partner node, the additional workload may thus be distributed among one or more partner nodes. A cluster 100 wherein a node 200 may have one or more predetermined failover partner nodes 200 may be referred to herein as an "N-way system." In some embodiments, each partner node takes over the workload of a failed primary node on a per aggregate basis, which is further described in detail in U.S. patent application Ser. No. 12/401,458, entitled "Takeover of a Failed Node of a Cluster Storage System on a Per Aggregate Basis," by Susan M. Coatney, et al., filed Mar. 10, 2009, which is incorporated herein by reference. Various components of the nodes 200 described below may communicate through the cluster switching fabric 150 to operate in conjunction to perform aggregate failover procedures described herein.

Figure 2:
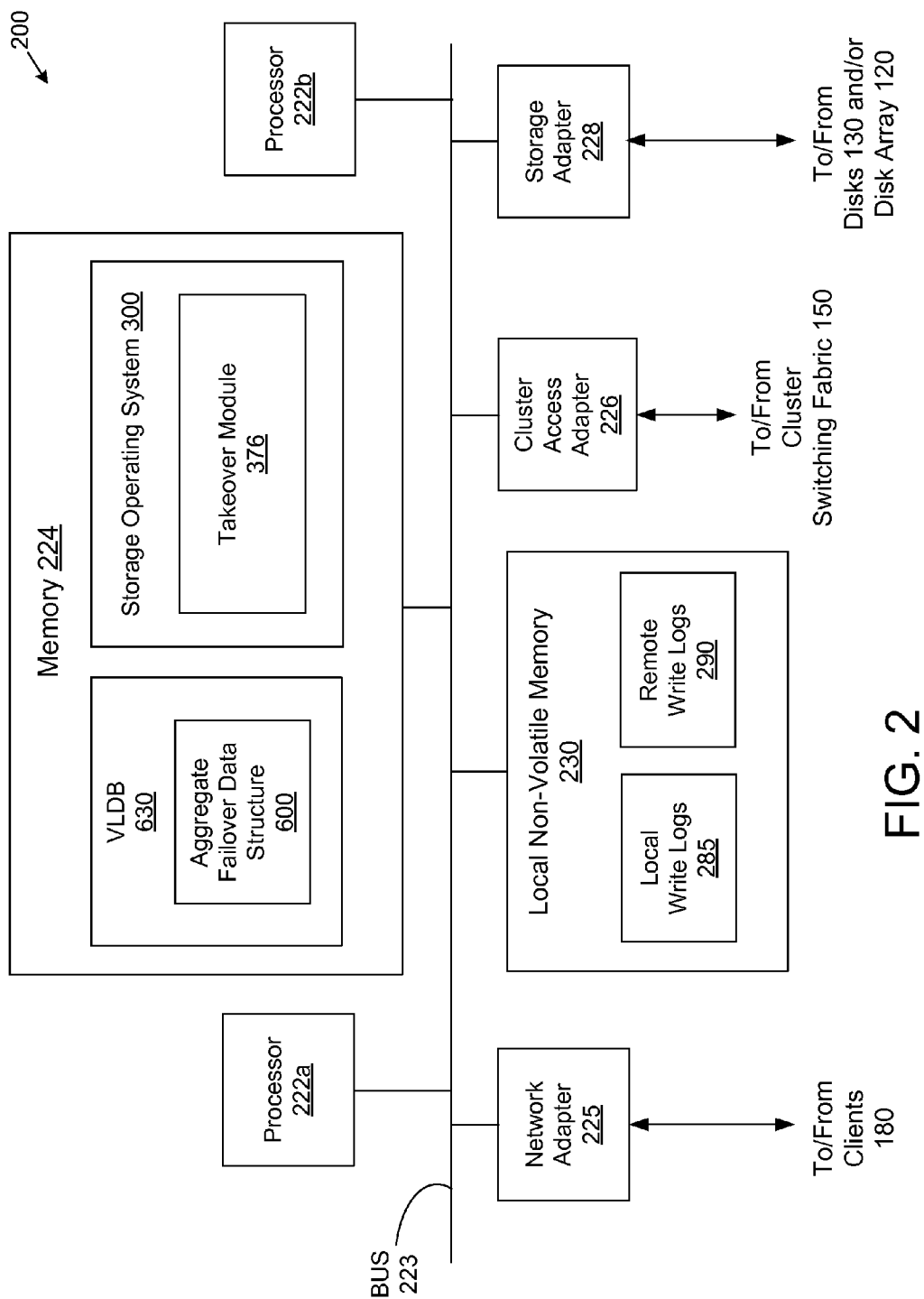
FIG. 2 is a schematic block diagram of an exemplary node that may be employed in the cluster environment.

FIG. 2 is a schematic block diagram of an exemplary node 200 that may be employed in the cluster environment of FIGS. 1A-B. A node 200 may be illustratively embodied as a storage system comprising a plurality of processors 222a,b, a memory 224, a network adapter 225, a cluster access adapter 226, a storage adapter 228, and local non-volatile memory device 230 interconnected by a system bus 223.

The cluster access adapter 226 comprises a plurality of ports adapted to couple the node 200 to other nodes of the cluster 100 (e.g., using the cluster switching fabric 150). In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node 200 over the network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

The memory 224 illustratively comprises storage locations that are addressable by the processors and adapters for storing software program code and data used in some embodiments. The processors and adapters may, in turn, comprise processing elements and/or logic circuitry configured to execute the software code and manipulate the data stored in the memory 224. In some embodiments, the memory 224 may comprise a form of random access memory (RAM) comprising "volatile" memory that is generally cleared by a power cycle or other reboot operation.

The storage operating system 300, portions of which is typically resident in memory and executed by the processing elements, functionally organizes the node 200 by, inter alia, invoking storage operations in support of the storage services implemented by the node. It will be apparent to those skilled in the art that other processing and memory means, including various computer readable media, may be used for storing and executing program instructions pertaining to embodiments described herein. In some embodiments, the storage operating system 300 comprises a plurality of software layers/engines (including a takeover module/engine 376) that are executed by the processors. In some embodiments, a software layer or a module (e.g., takeover module 376) may comprise an engine comprising firmware or software and hardware configured to perform embodiments described herein. In general, functions of a software layer or module described herein may be embodied directly in hardware, or embodied as software executed by a processor, or embodied as a combination of the two. In some embodiments, the takeover modules/engines of the nodes 200 of a cluster 100 operate in conjunction to takeover aggregates of a failed node. As discussed below, a takeover module/engine 376 may do so using an aggregate failover data structure (AFDS) 600 that is loaded and stored to memory 224.

The local non-volatile memory device 230 may comprise one or more storage devices (such as disks or solid state devices) utilized by the node to locally store configuration information (e.g., in a configuration table) provided by one or more management processes that execute as user mode applications. Alternatively, such information may be stored remotely. The local non-volatile memory device 230 that may be employed as a backup memory that ensures that the storage system does not "lose" received information, e.g., CIFS and NFS requests, in the event of a system shutdown or other unforeseen problem. In some embodiments, the non-volatile memory device 230 may comprise a rewritable computer memory for storing data that does not require power to maintain data/information stored in the computer memory and may be electrically erased and reprogrammed. Some examples of non-volatile memory devices include flash memory, non-volatile random access memory (NVRAM), Magnetic Random Access Memory (MRAM), Phase Change RAM (PRAM), etc. In other embodiments, other non-volatile memory devices are used other than those listed here. As discussed below, the local non-volatile memory device 230 may store local write logs 285 (produced by the local storage operating system 300) and remote write logs 290 (produced by a remote node 200 and retrieved or received from a global write-log device).

II. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the Data ONTAP® software operating system available from NetApp, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of the embodiments herein.

A. Software Layers of Storage Operating System

Figure 3:
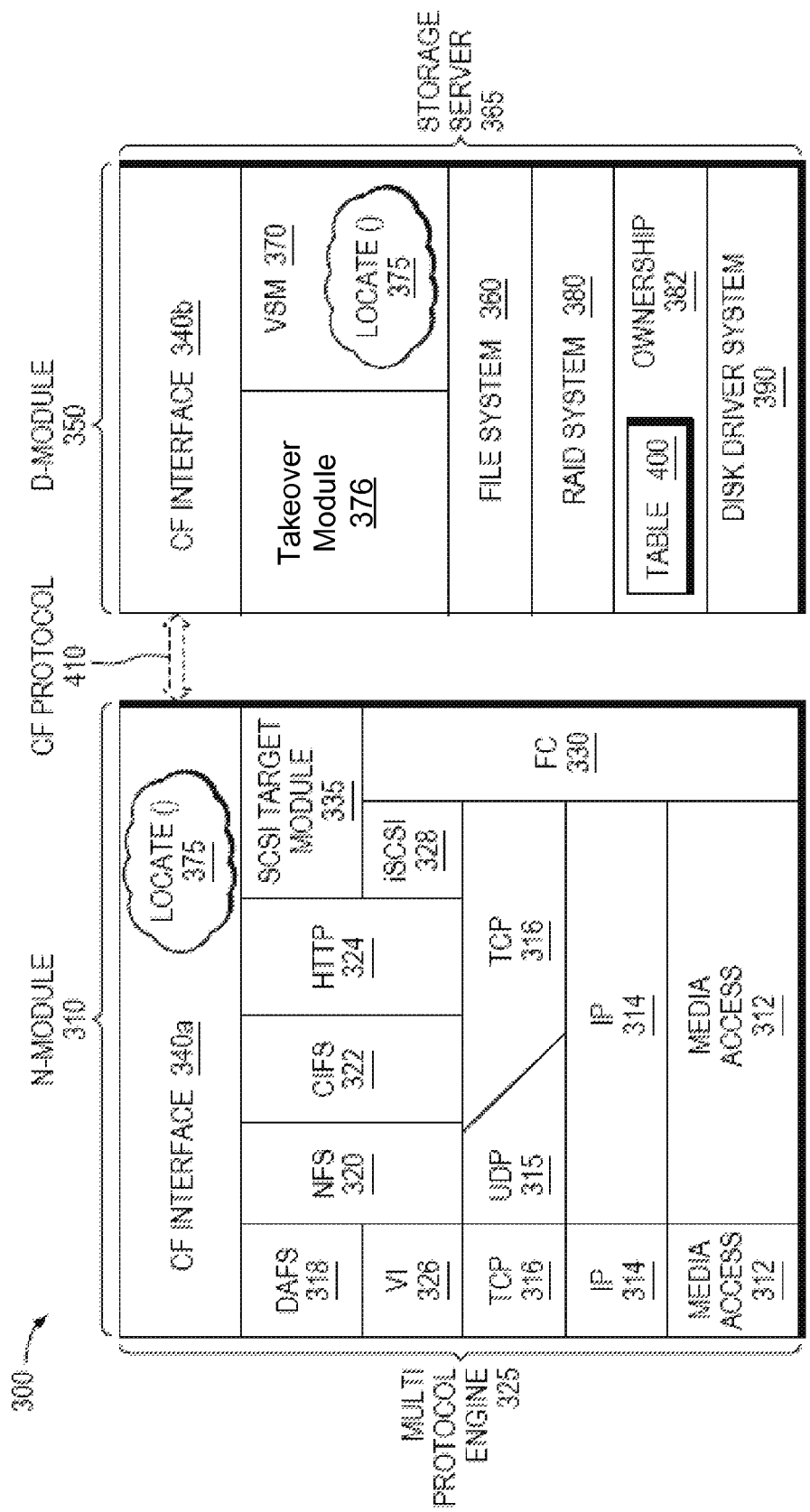
FIG. 3 is a schematic block diagram of an exemplary storage operating system that may be implemented by the node in FIG. 2.

FIG. 3 is a schematic block diagram of the storage operating system 300 that may be implemented by the node 200 in FIG. 2. The storage operating system 300 comprises a series of software layers organized to form an integrated network protocol stack or, more generally, a multi-protocol engine 325 (N-module 310) that provides data paths for clients 180 to access data stored on the node 200 using block and file access protocols. The multi-protocol engine 325 includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315.

A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 (D-module 350) that provides data paths for accessing data stored on the disks 130 of the node 200. The file system module 360 interacts in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the Small Computer System Interface (SCSI) protocol. However, it should be understood that processes other than the RAID system 380 may in other embodiments perform such tasks while remaining within the scope of the present invention.

The VSM 370 illustratively implements a striped volume set (SVS) and, as such cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

B. Disk Ownership

A disk ownership module 382 manages ownership of the disks with respect to their related aggregates and volumes using, for example, one or more data structures such as tables, including, for example, the disk ownership table 400. In particular, the ownership module 382 cooperates with the disk driver system 390 to identify the appropriate D-module for processing data access requests for particular volumes on the disk array 120. To that end, the ownership module consults disk ownership table 400, which contains disk ownership information that is illustratively generated at boot-up time, and that is updated by various components of the storage operating system to reflect changes in ownership of disks. Further details regarding the data structure implemented as ownership table 400 are provided in U.S. patent application Ser. No. 11/606,727, filed on Nov. 30, 2006, entitled "SYSTEM AND METHOD FOR STORAGE TAKEOVER," by Susan M. Coatney et al., which is incorporated herein by reference.

Notably, the disk ownership module 382 includes program instructions for writing proper ownership information 132 at a proper location 134 on each disk (as shown in FIG. 1A). Ownership information 132 of a disk 130 may indicate which node or D-module within the cluster 100 has permission to access the disk 130 (i.e., "owns" the disk 130). The disk ownership module 382 may do so using SCSI reservation tags (discussed in detail in above referenced U.S. patent application Ser. No. 11/606,727). The disk ownership table 400, which is maintained by the ownership module 382 of the storage operating system 300, may comprise a plurality of entries, one for each disk in the shared storage 135.

C. Takeover Module

Referring again to FIG. 3, the storage operating system 300 also comprises a takeover module 376 that operates in conjunction with the other software layers of the storage operating system 300 to takeover a failed node as described herein. The takeover module 376 may maintain and update data structures such as VLDB 630 and AFDS 600 (FIG. 2) used for taking over a failed node on a per aggregate basis. A takeover module 376 may reside and execute on each node 200 of the cluster 100. The takeover modules 376 in the nodes 200 may be configured to communicate and operate in conjunction with each other to perform the techniques described herein.

In some embodiments, each node 200 in the cluster 100 may receive (from clients) write requests for the shared storage and produce write logs representing the write requests. Each node 200 may be configured for periodically communicating/sending accumulated write logs to a global write-log device at time intervals (determined/specified by a predetermined time interval). In some embodiments, each node 200 may not be configured to send write logs to other nodes 200 in the cluster 100. In these embodiments, write logs are transmitted only between a node 200 and the global write-log device.

As discussed below, the global write-log device may detect failure of a node by monitoring the time intervals of when write logs are received from each node 200 in the cluster 100. If failure of a primary node is detected, the global write-log device may send a node-failure message indicating the failure of the primary node to one or more partner nodes in the cluster 100. In the rare instance a node has no accumulated write logs to transfer by the predetermined time interval, the node may produce "empty" write logs (e.g., comprising empty messages having null data) and send to the global write-log device, which are then treated by the global write-log device as receiving write logs from the node by the predetermined time interval (so the global write-log device does not determine the node has failed).

Receiving the node-failure message may trigger/initiate the takeover modules 376 residing and executing on the partner nodes 200 to operate in conjunction to takeover the aggregates of the failed primary node 200. In some embodiments, the takeover modules 376 residing on one or more partner nodes of a failed primary node each perform takeover procedures of the primary node on a per aggregate basis. In these embodiments, each takeover module 376 residing on a partner node begins takeover procedures for taking over an assigned aggregate sub-set owned by the failed primary node.

Each takeover module 376 of a partner node may refer to an aggregate failover data structure (AFDS) to determine which partner node takes over which aggregate sub-set of a failed node. In some embodiments, each node may maintain its own copy of the AFDS 600 (e.g., the AFDS 600 may be stored and maintained in the VLDB 630). In performing the takeover of an aggregate sub-set of the primary node, the takeover module 376 may operate in conjunction with other software layers and modules residing on the partner node 200, such as the file system 360, the RAID system 380, the ownership module 382 and the disk driver system 390, instructing each to perform particular routines/threads to implement the takeover procedures.

D. File System

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces in response to a user (system administrator) issuing commands (e.g., node takeover command) to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL® file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, an access request (read/write request) from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system produces operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the access request, the node 200 (and storage operating system 300) returns a reply to the client 180 over the network 140.

E. Storage Operating System Implementations

It should be noted that the software "path" through the storage operating system layers described above needed to perform data storage access for the client request received at the node may alternatively be implemented in hardware. That is, in an alternative embodiment, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system 300 can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including a write in place file system.

F. N-Module and D-Module

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a CF interface module 340a,b adapted to implement intra-cluster communication among the N- and D-modules, including D-module-to-D-module communication for data container striping operations.

The protocol layers, e.g., the NFS/CIFS layers and the iSCSI/FC layers, of the N-module 310 function as protocol servers that translate file-based and block-based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

G. CF Messages

In some embodiments, the N-module 310 and D-module 350 are implemented as separately-scheduled processes of storage operating system 300. In other embodiments, the N-module 310 and D-module 350 may be implemented as separate software components/code within a single operating system process. Communication between an N-module and D-module in the same node 200 is thus illustratively effected through the use of CF messages passing between the modules. In the case of remote communication between an N-module and D-module of different nodes, such CF message passing occurs over the cluster switching fabric 150.

A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp, Inc. The SpinFS protocol is described in the above-referenced U.S. Patent Application Publication No. US 2002/0116593.

The CF interface module 340 implements the CF protocol for communicating file system commands/messages among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command. As used herein, the term "CF message" may be used generally to refer to LPC and RPC communication between modules of the cluster. Further detail regarding CF messages is described in the above-referenced U.S. patent application Ser. No. 11/606,727.

H. Write Logs

In general, during a data-access session with a node 200, a client 180 may submit access requests (read/write requests) that are received and performed by the node 200. For the received write requests, each node 200 may perform write requests in two stages. In a first stage, a primary node 200 may receive write requests and produce a write log for each received write request. The write logs may be stored to a local memory device. In a second stage, upon occurrence of a predetermined initiating event (referred to as a "consistency point"), accumulated write logs 285 stored in the local memory device may be performed on the storage devices 130 of the shared storage 135 (whereby the received blocks of data are written to the storage devices).

In particular, in each node 200, the file system 360 may be configured to receive write requests for files and perform the received write requests in two stages. In the first stage, write requests are received by the file system layer 360, whereby a write request may contain blocks of data to be written. The file system 360 produces a write log for each received write request, the write log representing the write request and containing the blocks of data to be written. As used herein, a primary node produces "local write logs" 285 that may be stored locally to a non-volatile memory device, for example, to the local non-volatile storage 230 (as shown in FIG. 2).

As discussed below, to ensure data consistency, each node 200 may be configured to periodically send its write logs 285 to a global write-log device for remote storage. As such, if a local/primary node fails, a remote copy of the write logs of the failed primary node will be stored at the global write-log device which provides the write logs of the failed primary node to one or more partner node(s). As such, the partner nodes will still be able to perform the write logs on the storage devices 130 if the primary node fails. As used herein, a node receives "remote write logs" 290 of a failed node from the global write-log device and stores the remote write logs 290 to a local non-volatile memory device 230 (as shown in FIG. 2).

In a second stage, upon occurrence of an initiating event (referred to as a "consistency point") at the primary node, accumulated local write logs 285 stored in the local volatile memory device may be performed on the storage devices 130 (e.g., whereby the received blocks of data are written to the storage devices). To do so, the accumulated local write logs 285 may be sent to the RAID system layer 380 that then performs the write logs (e.g., by writing the blocks of data in the write logs to a storage device). The consistency point may be initiated by various predetermined initiating events such as the occurrence of a predetermined time interval, the storage size of the accumulated local write logs 285 reaching a predetermined threshold size, etc. Note that the consistency point may be initiated at different times for each node 200 in the cluster 100.

After the second stage is initiated at the consistency point, after a write log is performed on a storage device, the write log is committed to disk and thus may be deleted. As such, after the accumulated local write logs 285 are performed at the consistency point, the local write logs 285 may then be deleted from the local non-volatile memory device 230. Also, the local write logs 285 sent to the global write-log device may also be deleted from the global write-log device. To do so, after the accumulated local write logs 285 are performed, the node 200 may send a message to the global write-log device to delete the performed write logs 285. After the consistency point, the process repeats as new write logs are produced for new received write requests, the new write logs being processed by the file system 360.

III. Shared Storage

As discussed above, in relation to FIGS. 1A-B, the totality of storage space provided by the disks 130 and disk arrays 120 of the cluster 100 comprise a total shared storage space (referred to as "shared storage 135") of the cluster 100. The shared storage 135 is accessible by each D-module 350 of each node 200 in the cluster 100. Referring to FIG. 1B, for illustrative purposes, node A may be referred to as the local/primary node that may experience a failure, primary node A having one or more remote partner nodes (such as remote partner nodes B, C, and D) that are configured to assume the workload of the primary node A upon failure.

Figure 4:
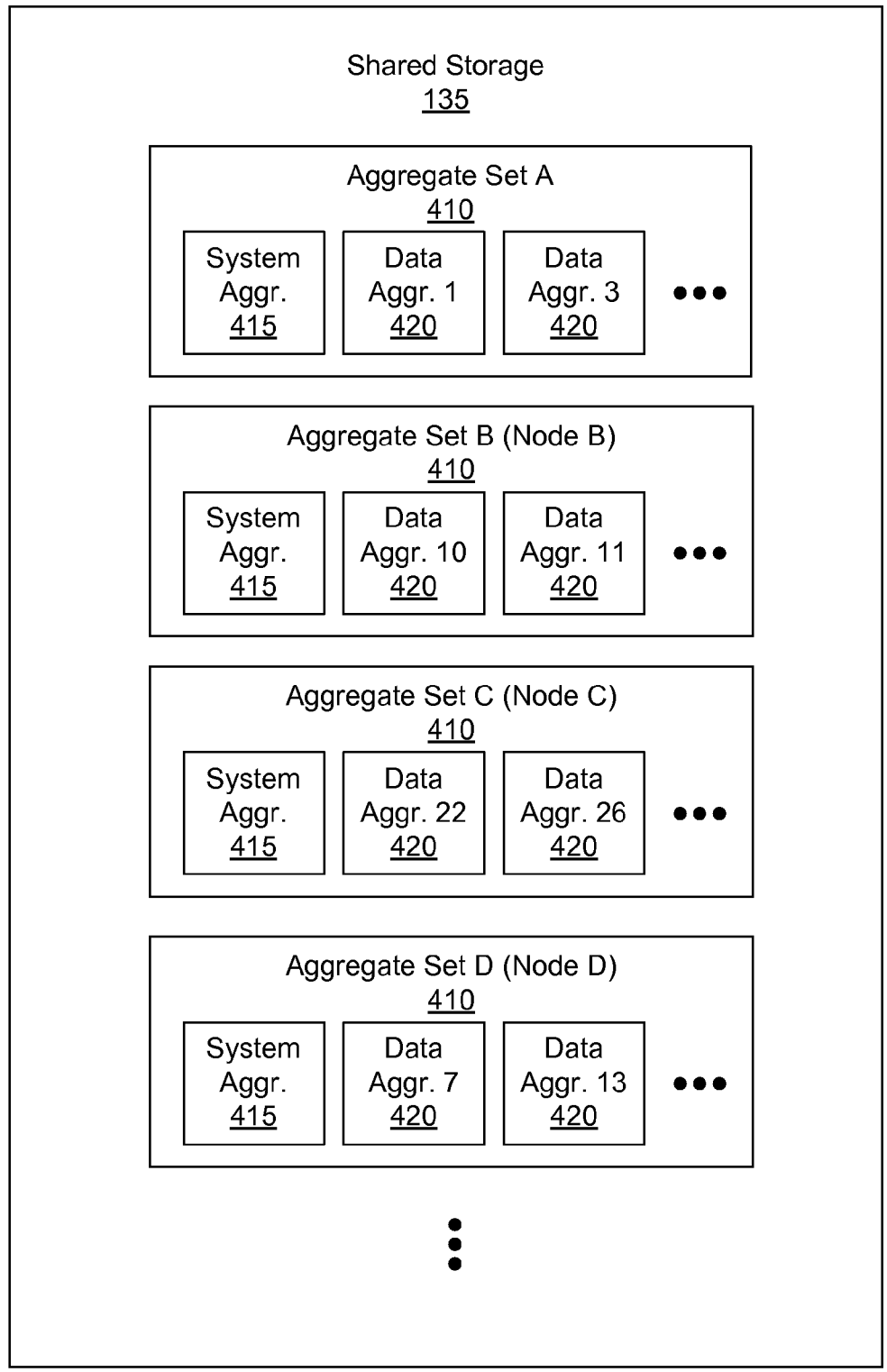
FIG. 4 shows a conceptual diagram of an exemplary shared storage comprising a plurality of aggregates.

FIG. 4 shows a conceptual diagram of an exemplary shared storage 135 of the cluster environment 100 of FIG. 1B. As shown in FIG. 4, the exemplary shared storage 135 comprises a plurality of aggregates, each aggregate comprising a sub-portion of the total available storage space of the shared storage 135. Each aggregate in the shared storage 135 may have an associated identifier (ID) that uniquely identifies the aggregate within the shared storage 135. In these embodiments, each node 200 of the cluster 100 is assigned/associated with a set of aggregates 410 ("aggregate set") in the shared storage 135. For example, node A may be assigned/associated with "Aggregate Set A," node B may be assigned/associated with "Aggregate Set B," etc. Each aggregate set may be used for serving and storing client data for the associated node 200. A node "owns" its assigned aggregate set within the shared storage 135 and serves/services data stored on the owned/assigned aggregate set.

In some embodiments, each node 200 owns an aggregate set 410 that comprises a system aggregate 415 and a plurality of data aggregates 420. Each system aggregate 415 may be used for storing local system information for the associated node 200. Such system information may include a volume location database (VLDB) 630 having information for mapping data containers to nodes that own the data containers within the cluster 100 (discussed further below). Although described as a database in some embodiments, the VLDB 630 may comprise any data structure in any variety of forms (e.g., table, list, database, etc.). As used herein, the VLDB 630 owned by a particular node 200 may be referred to as a "local" VLDB 630 of the particular node 200. In some embodiments, VLDB 630 also includes an aggregate failover data structure (AFDS) 600 that lists, for each node in the cluster 100, aggregate sub-sets owned by the node and one or more partner nodes assigned to takeover each aggregate sub-set (discussed further below). For example, the VLDB 630 and AFDS 600 may be stored to a root volume in the system aggregate 415, where upon boot/startup of the node 200, the VLDB 630 and AFDS 600 may be loaded and stored to memory 224 (as shown in FIG. 2).

As such, each node 200 may access, maintain, and store its own separate local copy of the VLDB 630 and AFDS 600 in a system aggregate 415 in the shared storage 135 owned by the node 200. In some embodiments, takeover of the aggregate set of a primary node is performed based on the AFDS 600 which specifies which partner node is to take over which aggregate sub-set (data aggregates 420) of the primary node. After takeover of the aggregate set of the primary node by the partner nodes, the VLDB 630 in each system aggregate 415 for each node 200 is updated in the shared storage 135 to reflect which partner nodes now own which data aggregates 420 of the primary node.

Each data aggregate 420 may be used for storing client data for the associated node 200, whereby clients 180 may read and write to the data aggregate 420. In some embodiments, upon a takeover of a primary node, the partner nodes takeover the data aggregates 420 owned by the primary node (and not the system aggregate 415 owned by the primary node). In some embodiments, each node owns a set of one or more data aggregates 420 (aggregate set) in the shared storage, the aggregate set being sub-divided into one or more sub-sets of data aggregates ("aggregate sub-sets"). Each aggregate sub-set may comprise one or more data aggregates 420 owned by the primary node.

In normal operation (when node failures have not occurred), the D-module 350 of each node 200 may be configured to access only the aggregate set assigned to the node 200 that it owns. For example, in normal operation, the D-module 350 of node A may be configured to access and serve data from only aggregate set A and the D-module 350 of node B may be configured to access and serve data from only aggregate set B. Therefore, in normal operation, all access requests (received at any N-module 310 of any node 200 in the cluster) for data stored in aggregate set A are routed through the D-module 350 of node A (and have physical addresses/file handles that specify the D-module 350 of node A). Note that the N-module 310 of each node can receive access requests for data in any aggregate 410 of the shared storage 135, and will route the access requests to the appropriate D-module 350 that services the requested data.

In the event of a node failure, the failed node is no longer capable of processing access requests (read/write requests) from clients 180 for data in the aggregate set assigned to the failed node. In such an event, the access requests sent to the failed node 200 may be re-directed to the one or more remote partner nodes 200 for processing. The remote partner nodes 200 of the failed node may be configured to collectively replace the failed node by accessing and serving data in the aggregate set assigned to the failed node (as well as the accessing and serving data in its own assigned aggregate). As such, upon failure of a node, "ownership" of the aggregate set assigned to the failed node may be transferred to the partner nodes (so that servicing of data for the aggregate set of the failed node may be taken over by the partner nodes). For example, upon failure of primary node A, remote partner nodes B, C, and D may each be configured to access and serve data stored in aggregate set A (whereas under normal operating conditions, the remote partner nodes B, C, and D would not have access to or serve data from aggregate set A). In some embodiments, upon failure of the primary node, each of the one or more partner nodes takes over ownership and servicing of an aggregate sub-set of the failed primary node. Thus, the additional workload of the failed primary node may be distributed among one or more partner nodes.

Figure 5:
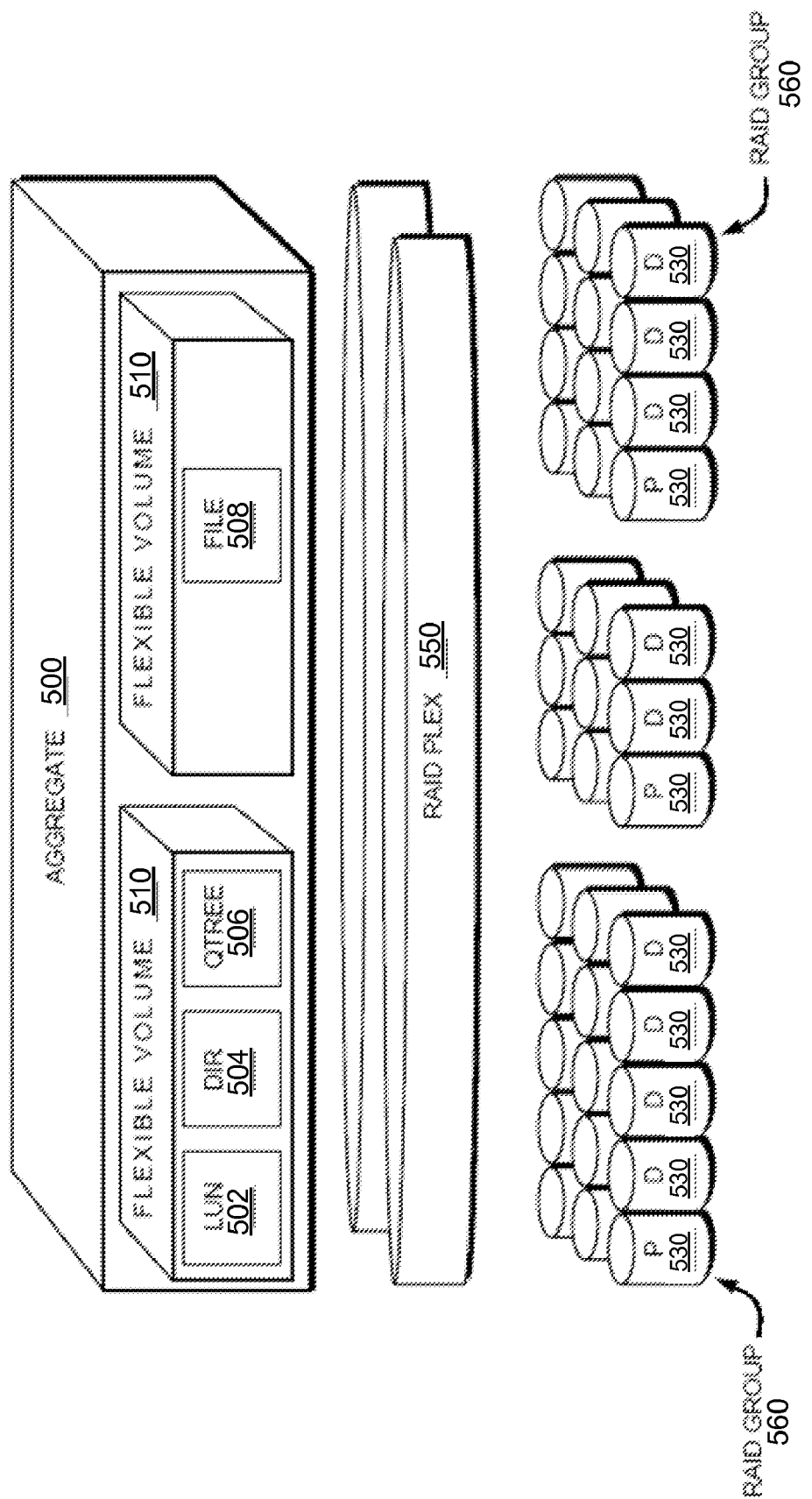
FIG. 5 is a schematic block diagram of an embodiment of an aggregate.

FIG. 5 is a schematic block diagram of an embodiment of an aggregate 500 (which may also be a data container, such as a physical volume) that may be used in some embodiments. The aggregate 500 may comprise one or more storage devices (e.g., disks 530), whereby the total storage space of an aggregate 500 may be provided by the one or more storage devices. The total storage space of an aggregate 500 may be allocated among a set of one or more flexible volumes 510. A flexible volume 510 may be dynamically increased or decreased in storage size within the total storage space of the aggregate 500. Each flexible volume 510 may comprise one or more data containers, such as, Luns (blocks) 502, directories 504, qtrees 506, files 508, etc. The aggregate 500 is illustratively layered on top of the RAID system, which is represented by at least one RAID plex 550 (depending upon whether the storage configuration is mirrored), wherein each plex 550 comprises at least one RAID group 560. Each RAID group further comprises a plurality of disks 530, e.g., one or more data (D) disks and at least one (P) parity disk. In general, each data container (e.g., flexible volume, aggregate, etc.) may have an associated identifier (ID) that uniquely identifies the data container within the shared storage 135. For example, each aggregate in the shared storage 135 may have an associated identifier (ID) that uniquely identifies the aggregate within the shared storage 135. Further detail regarding aggregates 500 and flexible volumes 510 is described in the above-referenced U.S. patent application Ser. No. 11/606,727.

As discussed above, the VLDB 630 is a database process that records/tracks the locations of the data containers (e.g., SVSs, flexible volumes, aggregates, etc.) within the shared storage 135 of the cluster 100 for routing requests throughout the cluster 100. Each data container (e.g., flexible volume, aggregate, etc.) may have an associated identifier (ID) that uniquely identifies the data container within the shared storage 135. Also, each node 200 may have an associated identifier (ID) that uniquely identifies the node 200 within the cluster 100. Further, each D-module 350 may have an associated identifier (ID) that uniquely identifies the D-module 350 within the cluster 100. In some embodiments, the D-module ID of a D-module 350 may be the same as the node ID of the node in which the D-module 350 resides. The VLDB 630 may comprise a database containing information for mapping a data container identifier (e.g., contained in a request received from a client 180), to a particular node 200 (or D-module 350) that "owns" (services) the requested data container within the cluster 100. For example, the VLDB 630 may contain a plurality of entries, each entry comprising a data container ID (e.g., aggregate ID) and a corresponding node ID (or D-module ID) that owns the data container.

The entries of the VLDB 630 may be used to provide the contents of entries in a configuration table. Alternatively, the entries of the VLDB 630 may be loaded to memory 224 (as shown in FIG. 2). In general, when receiving an access request, the N-module 310 of a node 200 may access the VLDB 630 for mapping a data container ID (received in the request) to a D-module 350 of a node 200 that owns the data container within the cluster 100. The N-module 310 may then route the request to the D-module 350 of the identified node 200 (e.g., through the cluster switching fabric 150). For example, when receiving a request, the N-module 310 of a node 200 may access the VLDB 630 for mapping the SVS ID of a data container handle to a D-module 350 of a node that owns the data container. In some embodiments, VLDB entries keep track of the locations of the flexible volumes (hereinafter generally "volumes 510") and aggregates 500 within the cluster.

Figure 6:
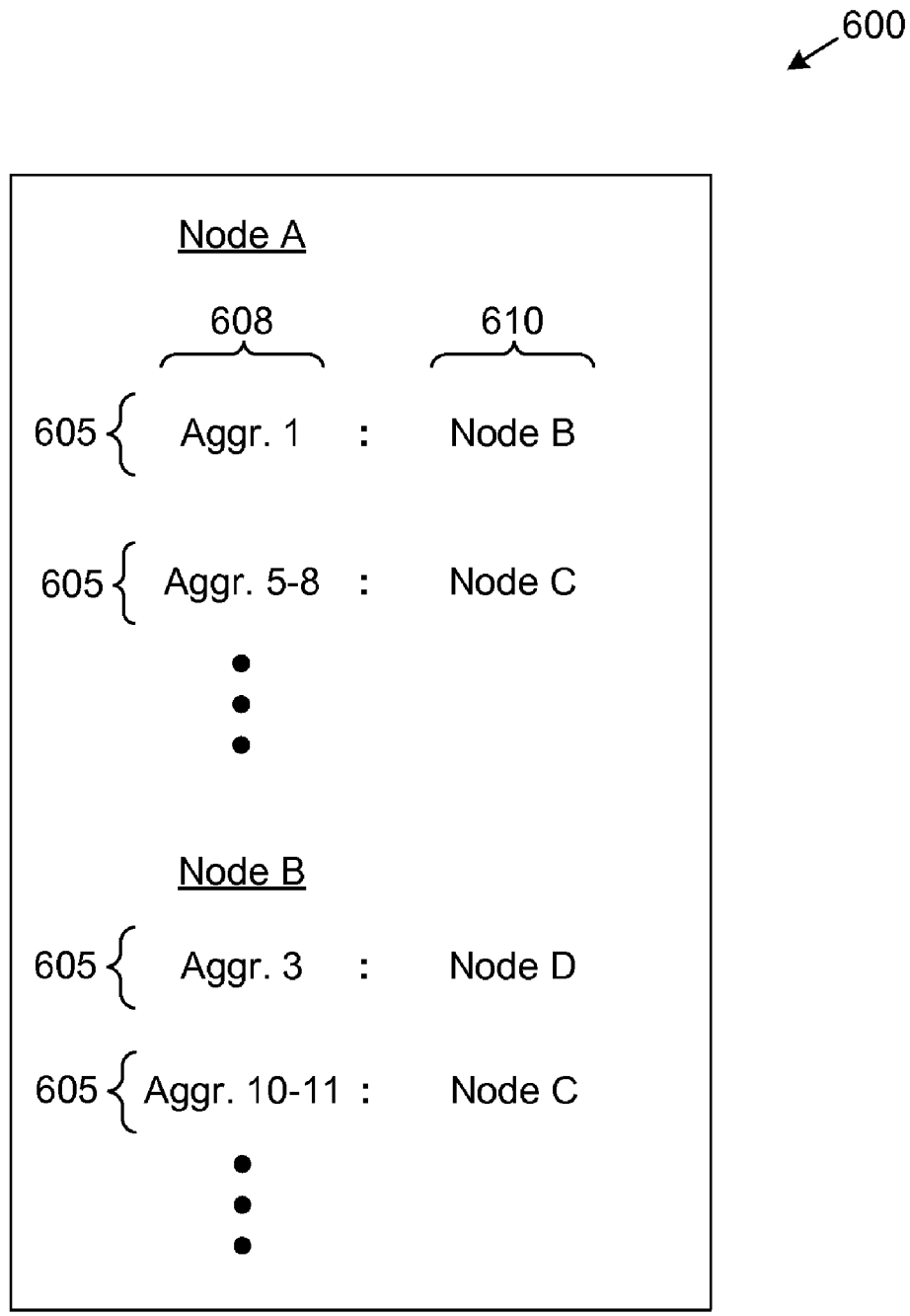
FIG. 6 shows a conceptual diagram of the contents of an exemplary AFDS.

As discussed above, the VLDB 630 may also include an aggregate failover data structure (AFDS) 600 used for taking over a failed primary node on a per aggregate basis (as described in U.S. patent application Ser. No. 12/401,458, entitled "Takeover of a Failed Node of a Cluster Storage System on a Per Aggregate Basis," by Susan M. Coatney, et al., filed Mar. 10, 2009, incorporated herein by reference). FIG. 6 shows a conceptual diagram of the contents of an exemplary AFDS 600. Note that an AFDS 600 may comprise a data structure in any variety of forms (e.g., table, list, database, etc.) and FIG. 6 is for illustrative purposes only. In some embodiments, each node may maintain its own copy of the AFDS 600. For each primary node in the cluster 100, the AFDS 600 may specify one or more aggregate sub-sets, each aggregate sub-set comprising one or more aggregates within the shared storage that are owned by the primary node. For each aggregate sub-set, the AFDS may specify at least one partner node assigned and configured to takeover the aggregate sub-set if the primary node fails.

As shown in FIG. 6, for each primary node 200, the AFDS 600 may include a plurality of entries 605 representing a plurality of aggregate sub-sets owned by the primary node. Each entry 605 may comprise an aggregate sub-set field 608 and a failover partner node field 610. The aggregate sub-set field 608 specifies one or more identifiers (aggregate IDs) of one or more aggregates of the aggregate sub-set. The partner node field 610 specifies an identifier (node IDs or D-module IDs) of a partner node or D-module assigned and configured to takeover the one or more aggregates specified in the aggregate sub-set field 608 (e.g., if the primary node fails or a command is received to do so). For example, for primary node A, the AFDS may list an entry 605 for a first aggregate sub-set comprising aggregate 1 to be taken over by partner node B, a second aggregate sub-set comprising aggregates 5-8 to be taken over by partner node C.

IV. Takeover of a Node on a Per Aggregate Basis

Figure 7:
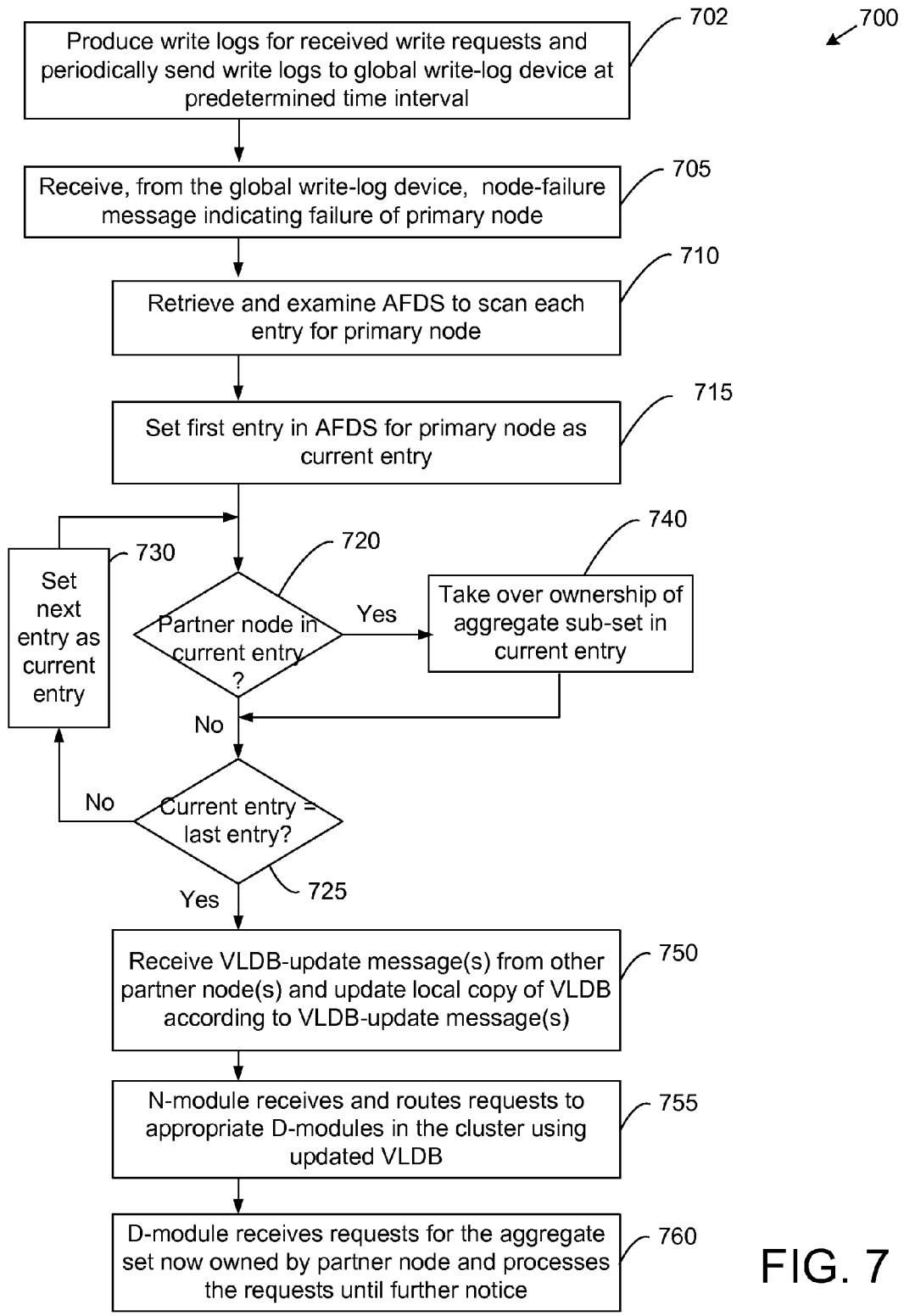
FIG. 7 is a flowchart of a method for producing write logs and taking over aggregates of a primary node by a partner node.

FIG. 7 is a flowchart of a method 700 for producing write logs and taking over aggregates of a primary node, on a per aggregate basis, by one or more partner nodes of the primary node using the information in AFDS 600. In some embodiments, some of the steps of the method 700 are implemented by software or hardware. In some embodiments, some of the steps of method 700 are performed by software layers of each partner node 200 in the cluster 100. In some embodiments, some of the steps of method 700 are performed by each file system 360 and takeover module 376 residing and executing on each partner node 200 in the cluster 100. The takeover modules 376 residing on one or more partner nodes 200 may operate simultaneously to takeover the aggregate set of the primary node. The order and number of steps of the method 700 are for illustrative purposes only and, in other embodiments, a different order and/or number of steps are used.

At step 702 of the method 700, each node 200 in the cluster 100 produces write logs for write requests received from clients and periodically communicates/sends the write logs to the global write-log device at predetermined time intervals. The takeover module 376 residing on a partner node then receives (at 705), from the global write-log device, a node-failure message indicating the failure of the primary node that initiates/triggers a takeover process of the aggregate set owned by the primary node. The primary node 200 may own an aggregate set comprising one or more aggregate sub-sets. The method 700 then retrieves and examines/reads (at step 710) the AFDS 600, and scans each entry 605 for the primary node in the AFDS 600. The method 700 sets (at step 715) the first entry 605 for the primary node as the "current entry" 605. The current entry 605 may represent and specify an aggregate sub-set (in the aggregate sub-set field 608) owned by the primary node and specify a failover partner node (in the failover partner node field 610) to take over the aggregate sub-set specified in the current entry 605 (referred to below as the "specified aggregate sub-set").

The method then determines (at 720) whether the partner node 200 or D-module 350 (in which the takeover module 376 resides) is specified in the current entry 605. For example, the method may determine whether the identifier for the partner node 200 (or D-module 350) is contained in the partner node field 610 in the current entry 605. If not, the partner node is not assigned to take over the specified aggregate sub-set and the method 700 then continues at step 725. If the method determines (at 720—Yes) that the partner node is specified in the current entry, the method 700 then takes over ownership (at step 740) of the specified aggregate sub-set. Details of the takeover process of the specified aggregate sub-set (in step 740) is discussed below in relation to FIG. 8.

At step 725, the method 700 determines whether the current entry is the last entry 605 for the primary node in the AFDS 600. If not, the method 700 sets (at step 730) the next entry 605 for the primary node in the AFDS 600 as the current entry 605 and returns to step 720. If the method 700 determines (at step 725—Yes) that the current entry is the last entry 605, the method continues at step 750.

Note that other takeover modules 376 on one or more other partner nodes (remote partner node) of the primary node may be simultaneously performing the above steps to take over another aggregate sub-set of the primary node. After taking over an aggregate sub-set of the primary node, the remote partner node may then send a "VLDB-update" message to each other partner node in the cluster 100. As discussed below, the VLDB-update message, received from a remote partner node taking over a particular aggregate sub-set, may contain information for updating the separate local copy of the VLDB 630 to reflect the new ownership of the particular aggregate sub-set by the remote partner node. At step 750, the method 700 may receive one or more VLDB-update messages from one or more other partner nodes in the cluster 100 and then updates its separate copy of its VLDB 630 according to the one or more VLDB-update messages.

After the VLDB 630 for each partner node in the cluster is updated to reflect the new owners of the aggregate sub-sets of the primary node, the N-modules of the partner nodes will be able to receive requests from clients and route the requests to the appropriate D-modules of the partner nodes. At step 755, the N-module of the partner node receives and routes requests to the appropriate D-modules in the cluster using the updated VLDB 630. At step 760, the D-module of the partner node receives requests for the aggregate set owned by the partner node (including requests for the newly obtained aggregate sub-set previously owned by the primary node) and processes the requests until further notice (e.g. the primary node is brought back online).

Figure 8:
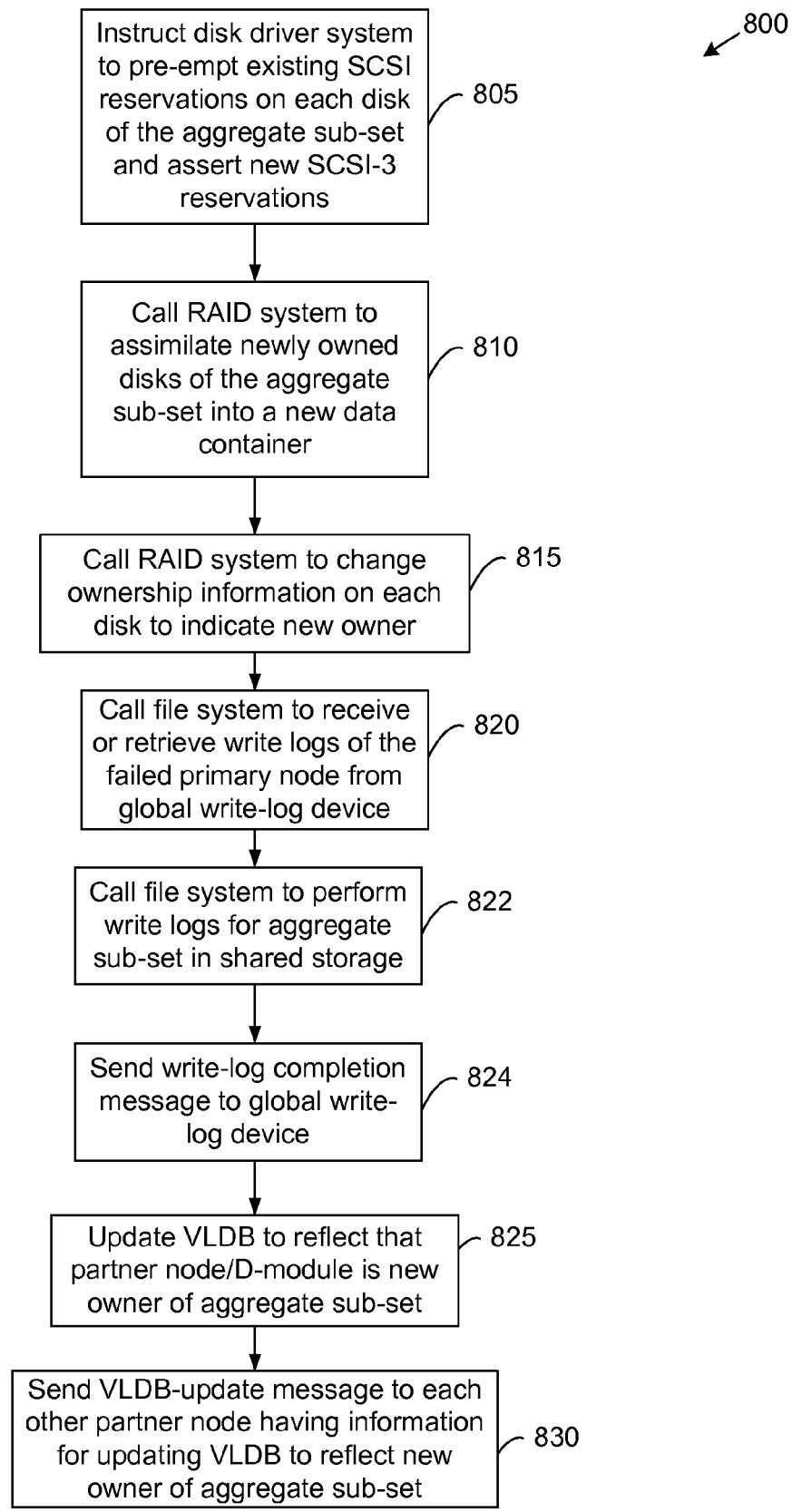
FIG. 8 is a flowchart of a method for taking over an assigned aggregate sub-set by a partner node.

FIG. 8 is a flowchart of a method 800 for taking over an assigned aggregate sub-set (owned by a primary node) by a partner node. The partner node may be assigned to take over the aggregate sub-set as specified in a current entry 605 of the AFDS 600. The method 800 may comprise step 740 of FIG. 7. In some embodiments, some of the steps of the method 800 are implemented by software or hardware. In some embodiments, some of the steps of method 800 are performed by a takeover module 376 residing and executing on the partner node. To do so, the takeover module 376 may operate in conjunction with other software layers and modules residing on the partner node 200, such as the file system 360, the RAID system 380, the ownership module 382 and the disk driver system 390, instructing each to perform particular routines/threads to implement the takeover procedure. The order and number of steps of the method 800 are for illustrative purposes only and, in other embodiments, a different order and/or number of steps are used.

The aggregate sub-set to be taken over may comprise a set of one or more storage devices (e.g., disks 130). The method 800 may takeover the one or more storage devices following the below procedures. The method may instruct (at step 805) the disk driver system 390 to pre-empt existing SCSI reservations on each disk of the aggregate sub-set (that were previously placed on the disks by the D-module of the primary node) and assert new SCSI-3 reservations on each disk of the aggregate sub-set. Using SCSI-3 reservations, a D-module can write to a disk if it holds the SCSI-3 reservations for that disk so that non-owning D-modules are prevented from writing to these disks because they do not have the SCSI-3 reservation. However, the non-owning file service can still read ownership information 132 from a predetermined location 134 on the disk. In some embodiments, if the SCSI-3 reservations do not match the on-disk ownership location data, the on-disk ownership information is used.

The method 800 then calls (at step 810) the RAID system 380 to assimilate all newly owned disks of the aggregate sub-set into a new data container. Illustratively, the RAID system 380 performs block-based assimilation of the newly acquired disks into aggregates, and the proper RAID calculations and configurations are performed. The method 800 then calls (at step 815) the RAID system 380 to change ownership information 132 on each disk 130 of the aggregate sub-set to indicate that the partner node is the new owner of the disk 130. Thereafter, the aggregate sub-set is owned by the D-module of the partner node 200.

The method 800 then retrieves (at step 820), from the global write-log device, write logs of the failed primary node that include the write logs for the aggregate sub-set being taken over. The global write-log device may allow the partner node to access and read the write logs of the failed primary node from a storage partition assigned to the failed primary node. In other embodiments, the method 800 receives (at step 820), from the global write-log device, the write logs of the failed primary node. The write logs of the failed primary node may be stored to a local non-volatile memory device 230 (shown as remote write logs 290 in FIG. 2). The method 800 then calls (at step 822) the file system 360 to perform, on the disks 130 of the aggregate sub-set in the shared storage 135, only those write logs for the aggregate sub-set being taken over. By performing write logs for the aggregate sub-set, the data in the aggregate sub-set will be as current/up-to-date as possible. The method 800 then sends (at step 824) a "write-log completion" message to the global write-log device indicating the write logs for the assigned aggregate sub-set have been performed. In some embodiments, after receiving a write-log completion message from each partner node assigned to take over an aggregate sub-set of the failed primary node, the global write-log device may delete the write logs of the failed primary node.

The method 800 then updates (at step 825) the VLDB 630 to reflect that, for each aggregate in the aggregate sub-set, the partner node (specifically, the D-module of the partner node) is the new owner of the aggregate and is servicing data for the aggregate. As discussed above, the VLDB 630 is used to map identifiers of data containers (e.g., volumes and aggregates) within the cluster 100 to the appropriate node that owns the data container. The VLDB 630 may include a plurality of aggregate entries, each entry having an aggregate ID field and a node ID/D-module ID field. For each entry for each aggregate in the aggregate sub-set, the method may update the node ID/D-module ID field to contain the node ID/D-module ID of the partner node that now owns the aggregate identified in the aggregate ID field.

The method 800 then sends (at step 830) a "VLDB-update" message to each other partner node 200 in the cluster 100. The VLDB-update message may contain information for the partner node 200 receiving the VLDB-update message to update its own copy of the VLDB 630 to reflect the new owner for each aggregate in the aggregate sub-set. For example, the VLDB-update message may contain aggregate IDs for each aggregate in the aggregate sub-set and the node ID/D-module ID for the new owner of each aggregate. The method 800 then ends.

Figure 9:
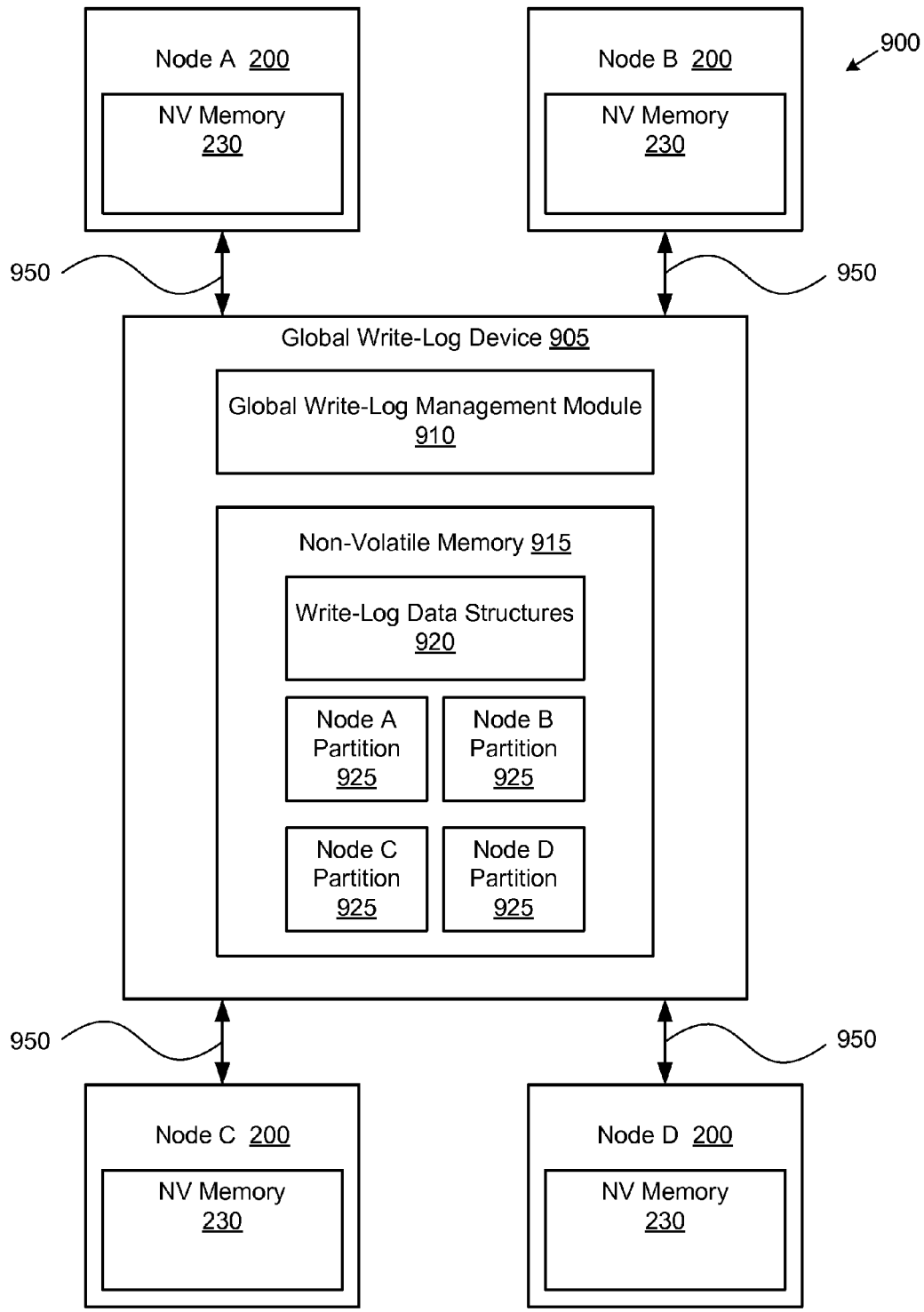
FIG. 9 shows a block diagram of an exemplary cluster storage system environment that implements a global write-log device for managing write-logs of nodes of a cluster.

V. Global Write-Log Device
A. Cluster Environment Implementing a Global Write-Log Device FIG. 9 shows a block diagram of an exemplary cluster storage system environment 900 that implements a global write-log device 905 for managing write-logs of nodes 200 of a cluster. The cluster 900 may comprise a plurality of nodes 200 configured to provide data-access services for a set of storage devices comprising a shared storage 135 (shown in FIG. 1B). The nodes 200 may be interconnected and communicate through a cluster switching fabric 150 (shown in FIG. 1B). Each node 200 may have one or more predetermined failover partner nodes 200 configured to automatically resume/takeover the data-access services of the failed node 200 (e.g., on a per aggregate basis). For illustrative purposes, node A may be referred to as the local/primary node that may experience a failure, primary node A having one or more failover partner nodes (such as remote partner nodes B, C, and D). For illustrative purposes, an exemplary AFDS 600 (shown in FIG. 6) specifies that partner node B take over a first aggregate sub-set of primary node A and that partner node C take over a second aggregate sub-set of primary node A upon failure of primary node A.

As shown in FIG. 9, each node 200 may be connected to the global write-log device 905 through a network 950. The network 950 may comprise the network 140 of FIG. 1A, the cluster switching fabric 150 of FIG. 1B, or a separate network dedicated to transmitting data regarding write-logs and write-log management. In some embodiments, the global write-log device 905 is physically external to each node 200 in the cluster 900 and is configured to operate independently from each node 200. The global write-log device 905 may be configured for maintaining operation upon failure of any node 200 or all nodes 200 in the cluster storage system 900. In some embodiments, each node 200 directly interacts with the global write-log device 905 to perform write-log procedures without requiring any operations of another node 200. For example, node A may directly interact with the global write-log device 905 without requiring operational assistance of nodes B, C, or D 200 in the cluster. As such, even if one or more nodes fail in the cluster, the global write-log device can still manage write logs of the cluster. In some embodiments, the global write-log device is a device dedicated to the management of the write logs of the nodes and is not configured to provide the functions of a node to provide data-access service to the shared storage. As such, the global write-log device may comprise a dedicated device that is less prone to operational failure than a node 200.

The global write-log device 905 may comprise a global write-log management (GWLM) module 910 and a non-volatile memory device 915. The global write-log device 905 may also comprise additional components, such as a processor, etc. (as described below in relation to FIG. 19). The global write-log management (GWLM) module 910 may be configured to perform the global write-log management techniques described herein. In some embodiments, a module (e.g., GWLM module 910) may comprise an engine comprising firmware or software and hardware configured to perform embodiments described herein. In general, functions of a module described herein may be embodied directly in hardware, or embodied as software executed by a processor, or embodied as a combination of the two. The non-volatile memory device 915 may comprise a component such as local non-volatile memory device 230 (described above in relation to FIG. 2). Examples of non-volatile memory devices include flash memory, non-volatile random access memory (NVRAM), Magnetic Random Access Memory (MRAM), Phase Change RAM (PRAM), etc. In other embodiments, other non-volatile memory devices are used other than those listed here.

The GWLM module 910 may produce or maintain write-log data structures 920 (stored in memory device 915) for storing data used in managing the write-logs of the nodes 200 in the cluster 100. As described below in relation to FIG. 18, the write-log data structures 920 may include a copy of the AFDS 600 and node data structures for collecting data about the nodes 200 (such as when write-logs were last received from each node and if the predetermined time interval for receiving write-logs has expired).

The memory device 915 may comprise a storage space. The GWLM module/engine 910 may be further configured for sub-dividing the storage space into a plurality of logical storage partitions 925, and allocating/assigning each partition 925 to a particular node 200 in the cluster 100 for storing write logs received from the node 200. In the example of FIG. 9, the GWLM module/engine 910 has sub-divided the storage space of the memory device 915 into a "node A" partition 925 assigned to store write logs received from node A, a "node B" partition 925 assigned to store write logs received from node B, etc.

B. Normal Condition Operations

Figure 10:
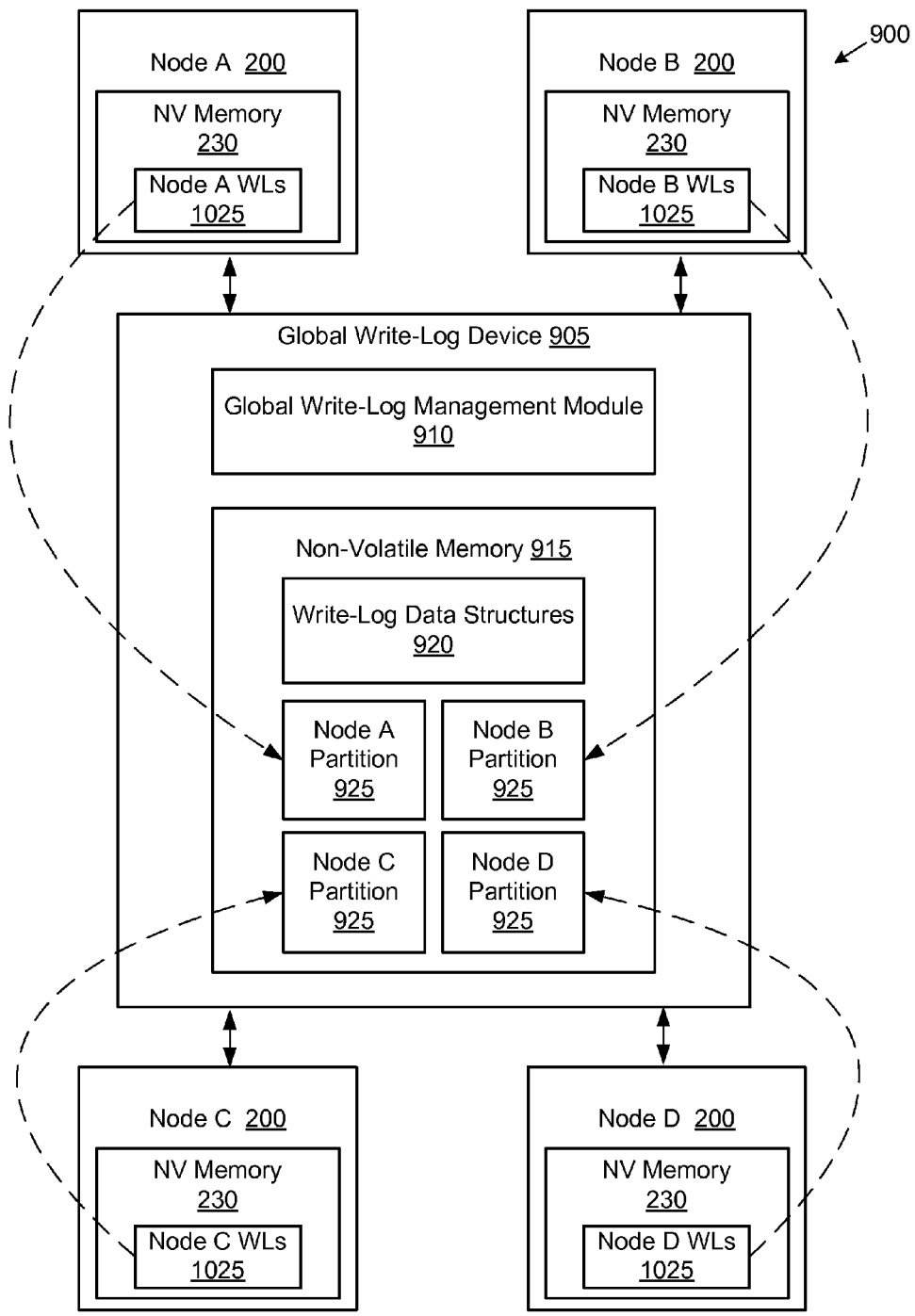
FIG. 10 shows a conceptual diagram of operations performed in the exemplary cluster storage system environment under normal conditions.

FIG. 10 shows a conceptual diagram of operations performed in the exemplary cluster storage system environment 900 under normal conditions (when a node failure has not been detected in the cluster). Each node 200 may be configured to receive write requests for the shared storage 135 from clients 180 and produce write logs 1025 representing the write requests. The write logs 1025 may be stored in local non-volatile memory device 230. For example, node A may produce "node A write logs (WLs)" 1025, node B may produce "node B write logs (WLs)" 1025, etc., whereby each node may store its produced write logs to its local non-volatile memory device 230 (shown as "NV Memory 230").

Each node 200 may be configured to periodically communicate/send (through network 950) its write logs 1025 (accumulated and stored in NV Memory 230) to the global write-log device 905. The GWLM module/engine 910 may be configured to receive write logs 1025 from each node 200 and store the write logs to the non-volatile memory device 915. In particular, the GWLM module/engine 910 may store write logs 1025 received from a node 200 to the storage partition 925 (in the memory device 915) assigned to the node 200. For example, the GWLM module/engine 910 may store write logs 1025 received from node A to "node A partition" 925, store write logs 1025 received from node B to "node B partition" 925, etc., as shown conceptually in FIG. 10.

Each node 200 may be configured to periodically send its write logs 1025 to the global write-log device 905 at time intervals determined by a predetermined time interval. For example, each node may be configured to communicate/send write logs 1025 to the global write-log device 905 every X seconds (the predetermined time interval). In the rare instance a node has no accumulated write logs to transfer by the predetermined time interval, the node may produce "empty" write logs (e.g., comprising empty messages having null data) and send to the global write-log device, which are then treated by the global write-log device as receiving write logs from the node by the predetermined time interval (so the global write-log device does not determine the node has failed). In some embodiments, each node 200 may not be configured to send write logs 1025 to other nodes 200 in the cluster 100. In these embodiments, write logs are transmitted only between a node 200 and the global write-log device 905.

The global write-log device 905 may be configured to detect failure of a node 200 in the cluster 900 by monitoring the time intervals of when write logs are received from each node 200. By providing a centralized global device for managing write-logs of all nodes of the cluster, a new method of detecting failure of a node is also provided through monitoring of the write-logs received by the nodes. As such, the cluster storage system may forego other methods of node failure detection (e.g., use of heartbeat signal passed between the nodes).

The global write-log device 905 may determine failure of a node 200 if it has not received write logs from the node 200 for a longer time period than the predetermined time interval (since the last time the global write-log device 905 received write logs from the node 200). As such, when not receiving write logs from a node for longer than the predetermined time interval when write logs were expected from the node 200, the global write-log device may determine that the node has failed (is in a failed state). In some embodiments, the global write-log device 905 may determine failure of a node if it has not received write logs 1025 from the node within a predetermined time threshold period that is approximately equal to or greater than the predetermined time interval. For example, the predetermined time threshold period may be X seconds plus Y seconds to provide a buffer period before a node is determined as failed.

C. Failed Node Operations

Figure 11:
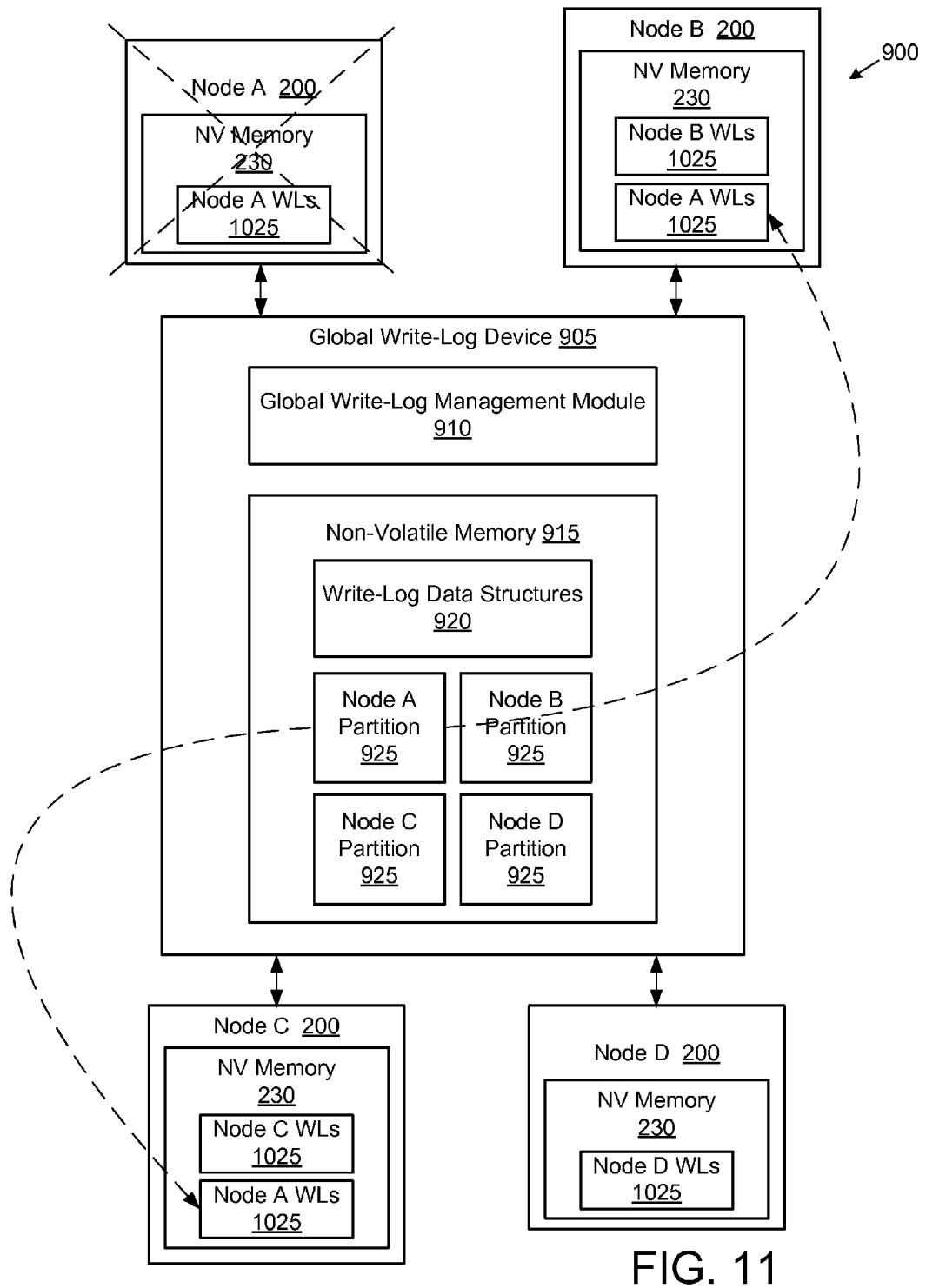
FIG. 11 shows a conceptual diagram of operations performed in the exemplary cluster storage system environment when a node failure has occurred.

FIG. 11 shows a conceptual diagram of operations performed in the exemplary cluster storage system environment 900 when a node failure has been detected in the cluster. In the example of FIG. 11, the GWLM module 910 has detected failure of node A (after not receiving write logs from node A for a longer time period than the predetermined time interval when write logs were expected from node A).

Upon detecting the failure of node A, the GWLM module 910 may then examine the AFDS 600 (stored in the memory 915 as a write-log data structure 920) which specifies which partner node is to take over which aggregates of a failed node. As shown in the exemplary AFDS 600 of FIG. 6, node A may service an aggregate set in the shared storage 135 comprising a first aggregate sub-set comprising aggregate 1 and a second aggregate sub-set comprising aggregates 5-8. The AFDS 600 further specifies that partner node B is assigned to take over first aggregate sub-set and partner node C is assigned to take over the second aggregate sub-set if node A fails.

The GWLM module 910 initiates/triggers one or more partner nodes in the cluster 900 to resume the data-access services of failed node A. The GWLM module 910 may do so by informing each partner node of the failure of node A (e.g., by communicating/sending a "node-failure" message indicating the failure of node A to each partner node B, C, and D in the cluster). Receiving the node-failure message may trigger/initiate each partner node 200 to takeover the aggregates of the failed primary node 200 (e.g., using the methods shown in FIGS. 7 and 8). In some embodiments, a node-failure message may include information regarding the aggregate set owned by the failed primary node that is to be taken over and/or information regarding which aggregate sub-set the partner node is to take over (according to the AFDS 600). In some embodiments, the node-failure message may be sent to only those partner nodes assigned to take over an aggregate sub-set of the failed primary node (according to the AFDS 600).

Note that the global write-log device 905 may have previously received write logs for the aggregate set from node A (referred to as "node A write-logs" 1025) and stored the write logs in "node A partition" 925 assigned to node A. The GWLM module 910 may then provide node A write-logs 1025 to one or more partner nodes based on the information in the AFDS 600. In some embodiments, the GWLM module 910 may do so by allowing access to the node A partition 925 to the one or more partner nodes based on the AFDS 600, so the one or more partner nodes may retrieve/read the node A write-logs 1025. In other embodiments, the GWLM module 910 may do so by retrieving node A write-logs 1025 from the node A partition 925 and communicating/sending the write logs to the one or more partner nodes based on the AFDS 600. For example, based on the AFDS 600, the GWLM module 910 may provide node A write-logs 1025 to partner nodes B and C.

In some embodiments, the GWLM module 910 may provide all the write logs of the failed node to each partner node assigned to takeover an aggregate sub-set of the failed node. In other embodiments, the GWLM module 910 may provide to a partner node only those write logs for the aggregate sub-set of the failed node it is assigned to takeover. For example, the GWLM module 910 may provide all the write logs of the node A to each partner node B and C. In other embodiments, the GWLM module 910 may provide to partner node B only those write logs for the first aggregate sub-set (aggregate 1) and provide to partner node C only those write logs for the second aggregate sub-set (aggregates 5-8).

As shown in FIG. 11, a partner node may retrieve/read or receive all or some write logs of the failed node from the GWLM module 910. Each partner node retrieving or receiving write logs of the failed node may store the write logs to a local memory device. For example, as shown in FIG. 11, partner nodes B and C each receive write logs of node A and store the write logs to NV memory 230. Note that node D does not retrieve or receive write logs of node A since, according to the AFDS 600, it is not assigned to take over any aggregates of failed node A. As such, the GWLM module 910 may not send any write logs of node A to node D, and may not allow node D to access the node A partition 925 to retrieve/read the write logs of node A.

Each partner node receiving write logs of the failed node may then perform the write logs on the storage devices of the shared storage 135. Each partner node receiving write logs of the failed node may perform only those write logs for the aggregate sub-set in the shared storage 135 it is assigned to take over. Other write logs of the failed node received or retrieved that are for other aggregate sub-sets being taken over by another partner node may be ignored/deleted. For example, node B may perform on the shared storage 135 only those write logs of node A that are for the first aggregate sub-set and node C may perform on the shared storage 135 only those write logs of node A that are for the second aggregate sub-set.

After a partner node completes performing the write logs on its assigned aggregate sub-set, the partner node sends a write-log completion message to the global write-log device 905. In some embodiments, after receiving a write-log completion message from each partner node assigned to take over an aggregate sub-set of the failed primary node, the global write-log device may delete the write logs of the failed primary node. For example, after receiving a write-log completion message from partner node B (indicating it has completed performing write logs on the first aggregate sub-set) and from partner node C (indicating it has completed performing write logs on the second aggregate sub-set), the GWLM module 910 may delete node A write logs 1025 from node A partition 925.

The above described interactions and operations between each node 200 and the global write-log device 905 may be performed using various types of commands, such as Remote Direct Memory Access (RDMA) commands, read/write commands, CF messages, etc. The commands and data may be sent over a network 950 that may comprise the network 140 of FIG. 1A, the cluster switching fabric 150 of FIG. 1B, or a separate network dedicated to transmitting data regarding write-logs and write-log management.

D. Method for Managing Write Logs

Figure 12:
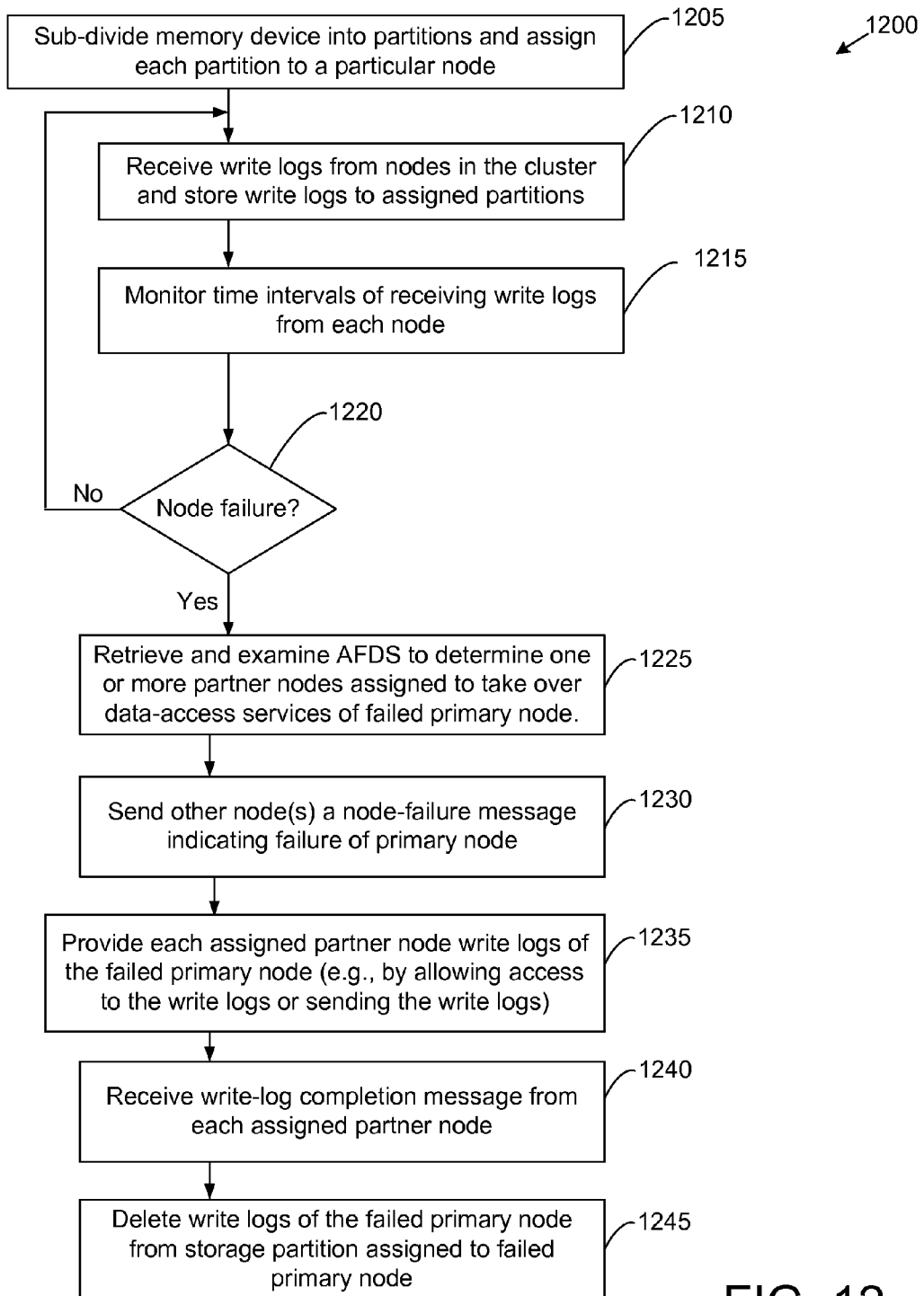
FIG. 12 is a flowchart of a method for managing write logs of nodes of a single-site cluster.

FIG. 12 is a flowchart of a method 1200 for managing write logs of nodes 200 of a cluster 900. In some embodiments, some of the steps of the method 1200 are implemented by software or hardware. In some embodiments, some of the steps of method 1200 are performed by the GWLM module 910 of the global write-log device 905 using write-log data structures 920 (that may include a copy of the AFDS 600) stored in a memory device 915 of the global write-log device 905. The order and number of steps of the method 1200 are for illustrative purposes only and, in other embodiments, a different order and/or number of steps are used.

The method 1200 begins by sub-dividing (at 1205) the storage space of the memory device 915 into a plurality of logical partitions 925, and allocating/assigning each partition 925 to a particular node 200 in the cluster 100 for storing write logs received from the node 200. The method 1200 then receives (at 1210) write logs from one or more nodes 200 in the cluster 900 and stores the received write logs from a node to the partition 925 assigned to the node 200.

The method 1200 monitors (at 1215) the time intervals of receiving write logs from each node 200. The method then determines (at 1220) whether a node failure in the cluster has occurred (e.g., by detecting that write logs from the failed node have not been received for a longer time period than a predetermined time interval when the write logs were expected from the failed node). If a node failure has not been detected, the method 1200 continues at step 1210.

If a node failure has been detected, the method 1200 then retrieves and examines/reads (at step 1225) the AFDS 600 (stored in memory device 915) to determine one or more partner nodes assigned to take over data-access services of the aggregate set owned by the failed primary node. The method 1200 then sends (at 1230) to one or more other nodes in the cluster a node-failure message indicating the failure of the node (primary node) that initiates/triggers a takeover process of the aggregate set owned by the primary node. In some embodiments, a node-failure message sent to a node may include information regarding the aggregate set owned by the failed primary node that is to be taken over and/or information regarding which aggregate sub-set the partner node is to take over (according to the AFDS 600). In some embodiments, the node-failure message may be sent to only those partner nodes assigned to take over an aggregate sub-set of the failed primary node (according to the AFDS 600).

The method 1200 provides (at 1235) each assigned partner node the write logs of the failed primary node (e.g., by allowing the partner nodes to access the storage partition 925 assigned to the failed primary node or by sending the write logs of the failed primary node to each assigned partner node). The method 1200 then receives (at 1240) a write-log completion message from each assigned partner node indicating that each assigned partner node has performed the write logs of the failed primary node on the shared storage 135. As such, the write logs of the failed primary node are deleted (at 1245) from the storage partition 925 assigned to the failed primary node. The method then ends.

VI. Global Write-Log Devices Used at Remote Storage Sites

A. Multi-Site Cluster Environment

In some embodiments, a cluster storage system 900 may comprise a global write-log device 905 connected with a plurality of nodes 200 at a single storage site, the cluster storage system 900 comprising a "single-site" cluster (e.g., as shown in FIG. 9). In other embodiments, a cluster storage system may comprise a plurality of remote storage sites each implementing a separate global write-log device. The multi-site cluster storage system may comprise a shared storage 135 that the plurality of sites each access.

Figure 13:
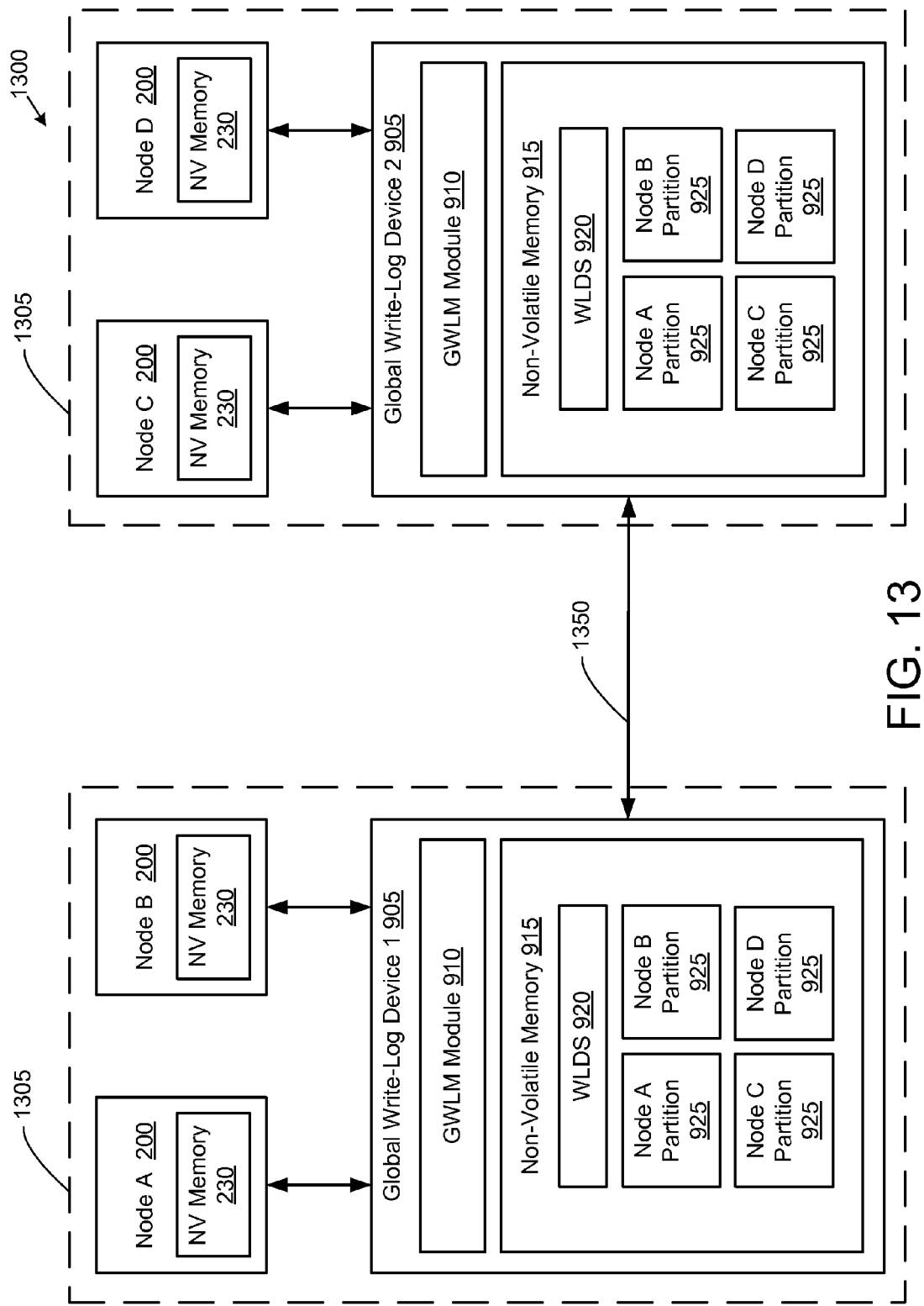
FIG. 13 shows a block diagram of an exemplary multi-site cluster storage system environment.

FIG. 13 shows a block diagram of an exemplary "multi-site" cluster storage system environment 1300. The multi-site cluster 1300 may comprise two or more storage sites 1305. Each storage site 1305 may comprise a global write-log device 905 connected with a plurality of nodes 200. Each node 200 in the cluster 1300 may be configured to provide data-access services for a set of storage devices comprising a shared storage 135 (shown in FIG. 1B). As such, the nodes of all storage sites 1305 in the cluster 1300 may access the same shared storage 135. Some components of the multi-site cluster system 1300 may be similar to components of the single-site cluster system 900 of FIG. 9 and are not discussed in detail here.

At each site 1305 the global write-log device 905 receives and stores write logs from each node 200 within the site. As described above, the write logs stored at the global write-log device 905 may provide failover protection for nodes within the same site (referred to as "local failover protection"). In local failover protection, a partner node may takeover data-access services of a failed primary node, the partner node and the primary node being located within the same storage site 1305. For example, as shown in FIG. 13, node B may provide local failover protection to node A if node A fails.

In some embodiments, the global write-log device 905 does not receive write logs directly from nodes 200 of another site 1305. In these embodiments, the global write-log devices 905 of different sites 1305 are connected by a network 1350. The network 1350 may comprise the network 950 of FIG. 9, the network 140 of FIG. 1A, the cluster switching fabric 150 of FIG. 1B, or a separate network dedicated to transmitting data regarding write-logs between storage sites 1305. The geographical distance between storage sites 1305 may typically be far (e.g., California and New York storage sites). In some embodiments, the storage sites 1305 are only directly connected through the global write-log devices 905 of the different sites 1305, which are connected through the network 1350. Given the typically long distances between the storage sites 1305, a single connection between the global write-log devices 905 at the storage sites 1305 may be the only feasible option (rather than multiple connections between global write-log devices 905 and each node 200 at different storage sites 1305).

The global write-log devices of the different sites 1305 may be connected for transmitting write logs between the global write-log devices and the sites 1305. The write logs stored remotely at a global write-log device 905 in a different site 1305 may provide failover protection for nodes that are not within the same site (referred to as "remote failover protection"). In remote failover protection, a partner node may takeover data-access services of a failed primary node, the partner node and the primary node being located within different storage sites 1305.

For example, as shown in FIG. 13, node C may provide remote failover protection to node A if node A fails. To do so, a first global write-log device at a first site may transmit its write logs to a second global write-log device at a second site for remote storage of its write logs. Upon failure of primary node A at the first site, the second global write-log device may then provide the write logs of the primary node to partner node C at the second site, partner node C being configured to take over the data-access services of primary node A upon failure of the primary node. As such, by replicating write logs across different sites, failover protection of the primary node may be provided by a node at the first site ("local failover protection") as well as by a node at the second site ("remote failover protection").

B. Normal Condition Operations

Figure 14:
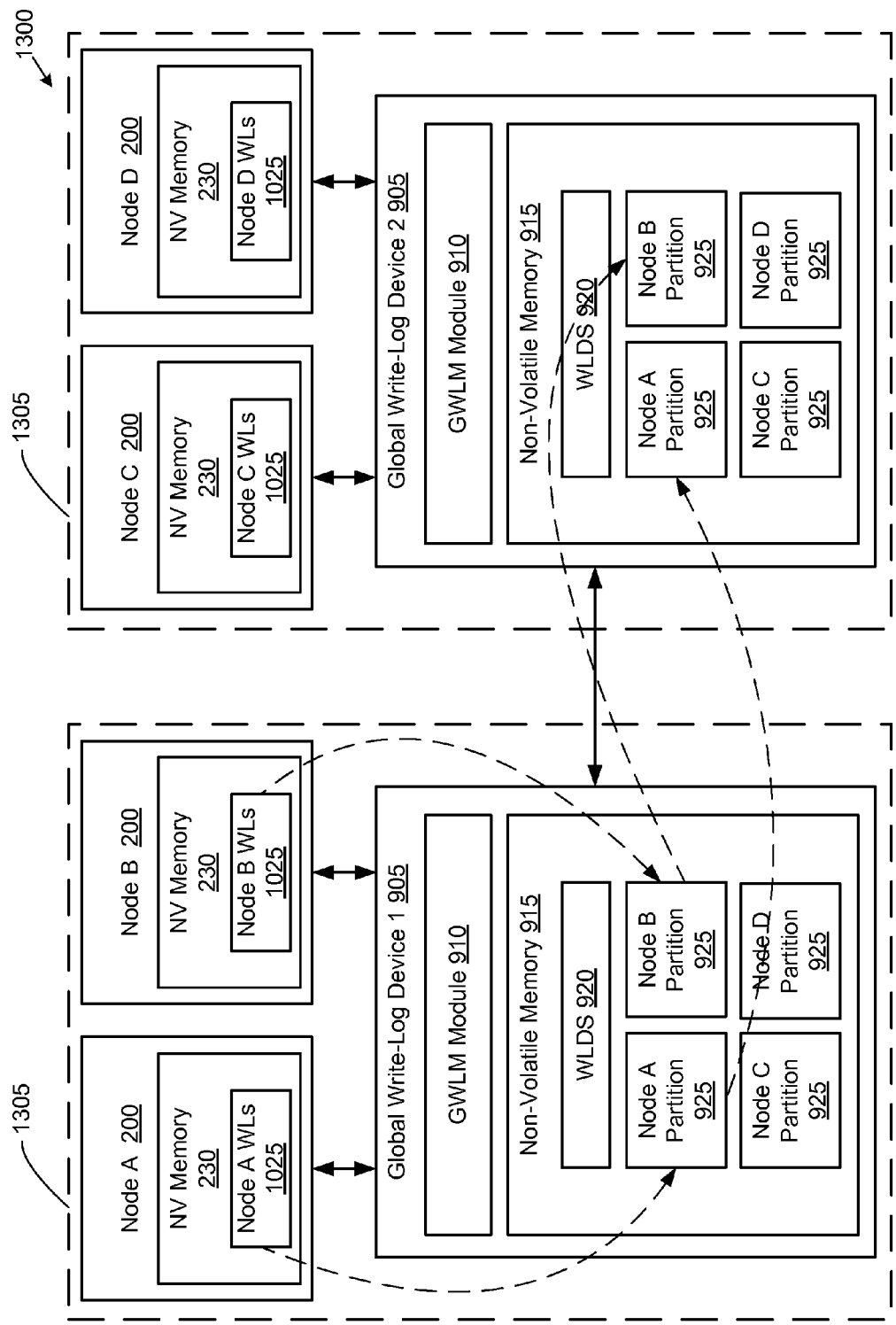
FIG. 14 shows a conceptual diagram of operations performed in an exemplary multi-site cluster storage system environment under normal conditions.
Figure 15:
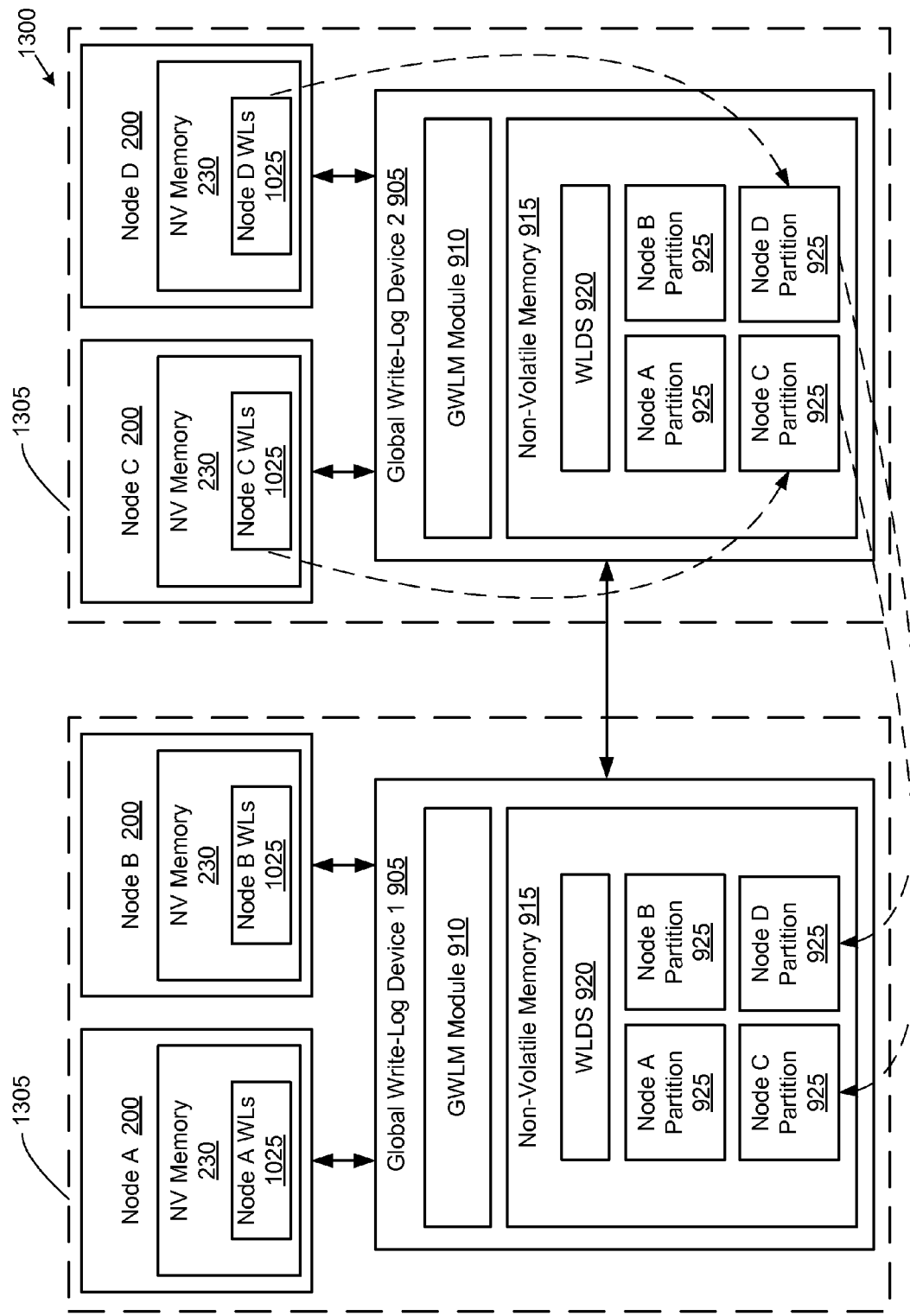
FIG. 15 shows a conceptual diagram of operations performed in an exemplary multi-site cluster storage system environment under normal conditions.

FIGS. 14 and 15 show conceptual diagrams of operations performed in the exemplary multi-site cluster storage system environment 1300 under normal conditions (when a node failure has not been detected in the cluster 1300). As shown in FIGS. 14 and 15, at each site 1305, each node 200 produces write logs 1025 representing write requests and stores to local non-volatile memory device 230. For example, at site 1: node A may produce "node A write logs (WLs)" 1025 and node B may produce "node B write logs (WLs)" 1025, and at site 2: node C may produce "node C write logs (WLs)" 1025 and node D may produce "node D write logs (WLs)" 1025. At each site 1305, each node 200 periodically communicates its write logs 1025 to the global write-log device 905 located within the same site 1305.

At each site, the global write-log device 905 receives write logs 1025 from each node 200 within the same site 1305 and stores the write logs to a storage partition 925 (in the memory device 915) assigned to the node 200. For example, as shown in FIG. 14, at site 1, a first global write-log device 905 may store write logs 1025 received from node A to "node A partition" 925 and store write logs 1025 received from node B to "node B partition" 925. As shown in FIG. 15, at site 2, a second global write-log device 905 may store write logs 1025 received from node C to "node C partition" 925 and store write logs 1025 received from node D to "node D partition" 925.

In some embodiments, a global write-log device may also be configured for periodically communicating/sending (through network 1350) its write logs (stored in memory device 915) to one or more other global write-log devices located at different sites 1305 for remote storage of its write logs. For example, as shown in FIG. 14, at site 1, the first global write-log device 905 may transmit write logs 1025 received from node A (stored in node A partition 925) and write logs 1025 received from node B (stored in node B partition 925) to the second global write-log device located at site 2. The second global write-log device 905 may receive the write logs from the first global write-log device 905 and store the write logs to its memory device 915. For example, as shown in FIG. 14, at site 2, the second global write-log device 905 may store write logs 1025 of node A to a "node A partition" 925 and store write logs of node B to a "node B partition" 925 in memory device 915. As shown in FIG. 15, similar operations are performed at site 2, whereby write logs stored at the second global write-log device 905 are transmitted and stored to the first global write-log device 905.

C. Failed Node Operations

At each site 1305, the global write-log device 905 may monitor time intervals of receiving write logs from each node within the site 1305 to determine if a node has failed. For illustrative purposes, in the examples given below, the global write-log device 905 may detect failure of node A (in site 1) which comprises a failed primary node. For illustrative purposes, an exemplary AFDS 600 (shown in FIG. 6) specifies that partner node B (located in the same site 1 as node A) is assigned to take over a first aggregate sub-set of primary node A and that partner node C (located in different site 2 as node A) is assigned to take over a second aggregate sub-set of primary node A upon failure of primary node A.

Figure 16:
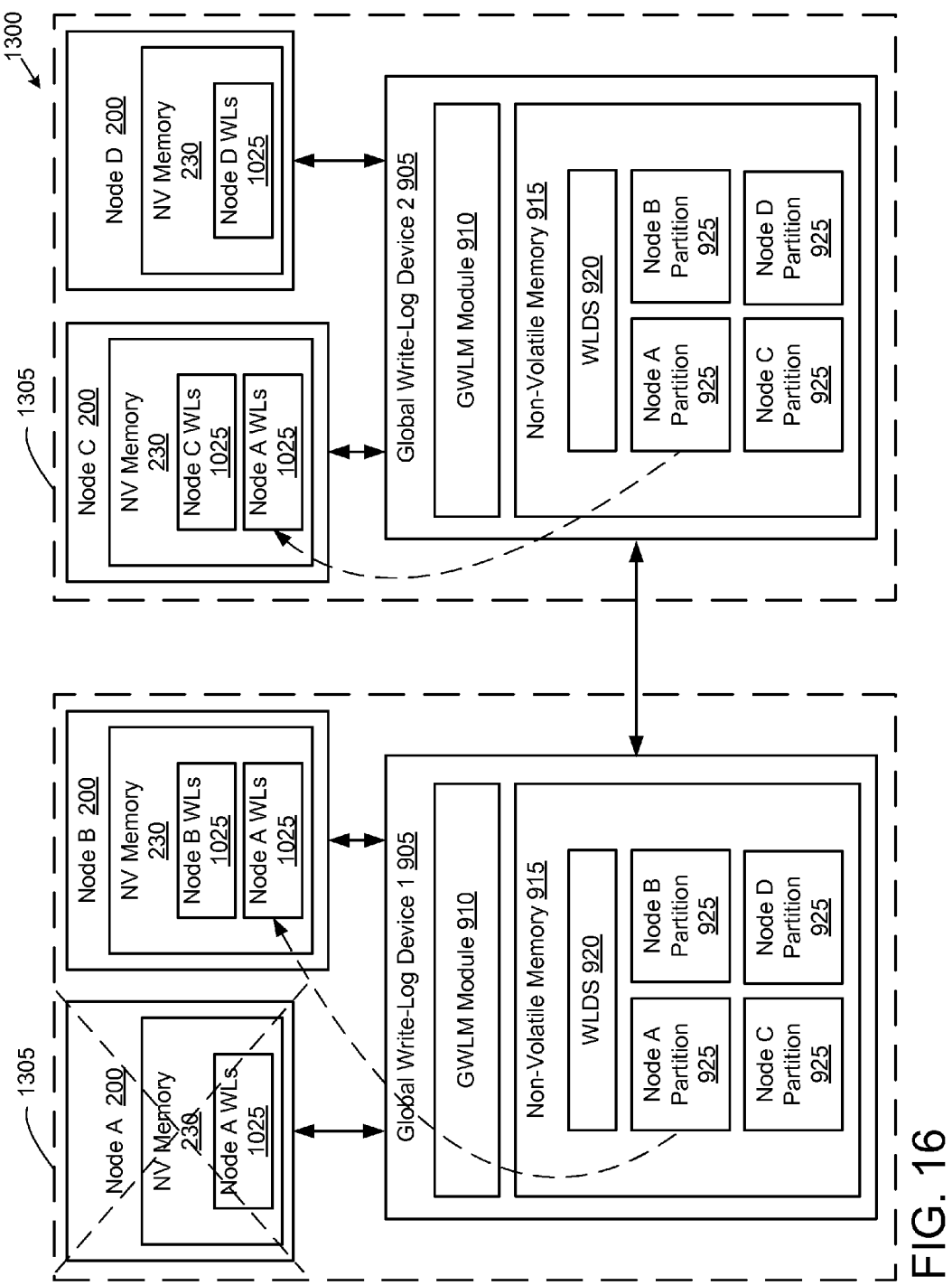
FIG. 16 shows a conceptual diagram of operations performed in an exemplary multi-site cluster storage system environment when a node failure has occurred.

FIG. 16 shows a conceptual diagram of operations performed in the exemplary cluster storage system environment 1300 when a node failure has been detected in the cluster. In the example of FIG. 16, the first global write-log device 905 at site 1 has detected failure of node A at site 1. Upon detecting the failure of node A, the first global write-log device 905 may then examine the AFDS 600 (stored in the memory 915 as a write-log data structure 920) which specifies which partner node is to take over which aggregates of a failed node. As shown in the exemplary AFDS 600 of FIG. 6, the AFDS 600 specifies node A owns an aggregate set comprising first and second aggregate sub-set, that partner node B (at site 1) is assigned to take over first aggregate sub-set, and that partner node C (at site 2) is assigned to take over the second aggregate sub-set if node A fails.

The first global write-log device 905 then initiates/triggers one or more partner nodes in the cluster 1300 to resume the data-access services of failed node A. The first global write-log device 905 may do so by informing each other node in site 1 of the failure of node A (e.g., by communicating/sending a "node-failure" message indicating the failure of node A to each partner node B). The first global write-log device 905 may also inform the second global write-log device 905 in site 2 of the failure of node A (e.g., by communicating/sending a "node-failure" message indicating the failure of node A). The second global write-log device 905 may then inform each node within its same site (site 2) of the failure of node A (e.g., by communicating/sending a "node-failure" message indicating the failure of node A to nodes C and D).

In some embodiments, a node-failure message sent to a node or another global write-log device 905 may include information regarding the aggregate set owned by the failed primary node that is to be taken over and/or information regarding which aggregate sub-set a partner node is to take over (according to the AFDS 600). In some embodiments, the node-failure message may be sent to only those partner nodes assigned to take over an aggregate sub-set of the failed primary node (according to the AFDS 600). For each node in the cluster 1300, receiving the node-failure message may trigger/initiate the node 200 to takeover the aggregates of the failed primary node 200 (e.g., using the methods shown in FIGS. 7 and 8). For example, node B in site 1 and nodes C and D in site 2 may be triggered to initiate takeover operations of failed node A.

Note that each global write-log device 905 in the cluster 1300 may have previously stored write logs for the aggregate set (referred to as "node A write-logs" 1025) and stored the write logs in "node A partition" 925 assigned to node A. Each global write-log device 905 may then provide write logs of the failed node (e.g., by allowing access to the write logs or sending the write logs) to one or more partner nodes within the same site, based on the information in the AFDS 600. For example, based on the AFDS 600, the first global write-log device 905 may provide node A write-logs 1025 to partner node B at site 1 and the second global write-log device 905 may provide node A write-logs 1025 to partner node C at site 2.

As shown in FIG. 16, a partner node may store write logs of the failed node to a local memory device. For example, as shown in FIG. 16, partner nodes B and C each receive write logs of node A and store the write logs to local NV memory 230. Note that node D does not retrieve or receive write logs of node A since, according to the AFDS 600, it is not assigned to take over any aggregates of failed node A. Each partner node receiving write logs of the failed node may then perform only those write logs for the aggregate sub-set in the shared storage 135 it is assigned to take over.

After a partner node completes performing the write logs on its assigned aggregate sub-set, the partner node sends a write-log completion message to the global write-log device 905 within the same site. After receiving a write-log completion message from each partner node in the same site assigned to take over an aggregate sub-set of the failed primary node, the global write-log device may delete the write logs of the failed primary node from its memory device 915. For example, after receiving a write-log completion message from partner node B, the first global write-log device 905 may delete node A write logs 1025 from node A partition 925. Likewise, after receiving a write-log completion message from partner node C, the second global write-log device 905 may delete node A write logs 1025 from node A partition 925.

The above described interactions and operations between each node 200 and the global write-log device 905 may be performed using various types of commands, such as Remote Direct Memory Access (RDMA) commands, read/write commands, CF messages, etc. The commands and data may be sent over a network 1350 that may comprise the network 950 of FIG. 9, the network 140 of FIG. 1A, the cluster switching fabric 150 of FIG. 1B, or a separate network dedicated to transmitting data regarding write-logs and write-log management.

As described above, global write-log devices connected between distant storage sites 1305 may be used to provide local or remote protection for node failures. In some embodiments, data exchanges between the storage sites 1305 is reduced. In these embodiments, write log data is transmitted between the storage sites only through the global write-log devices. Also, the storage sites may be directly connected only through the global write-log devices (using network 1350). In these embodiments, each node 200 of a site may be configured to not send write logs 1025 to any other nodes 200 (in the same or different sites) and also be configured to not send write logs 1025 to a global write-log device of another site. As such, use of I/O resources of the nodes 200 at each site 1305 may be reduced. Also, each node may be configured to not store write logs of another node in the cluster storage system to reduce use of storage resources.

D. Method for Managing Write Logs in Multi-Site Cluster

Figure 17:
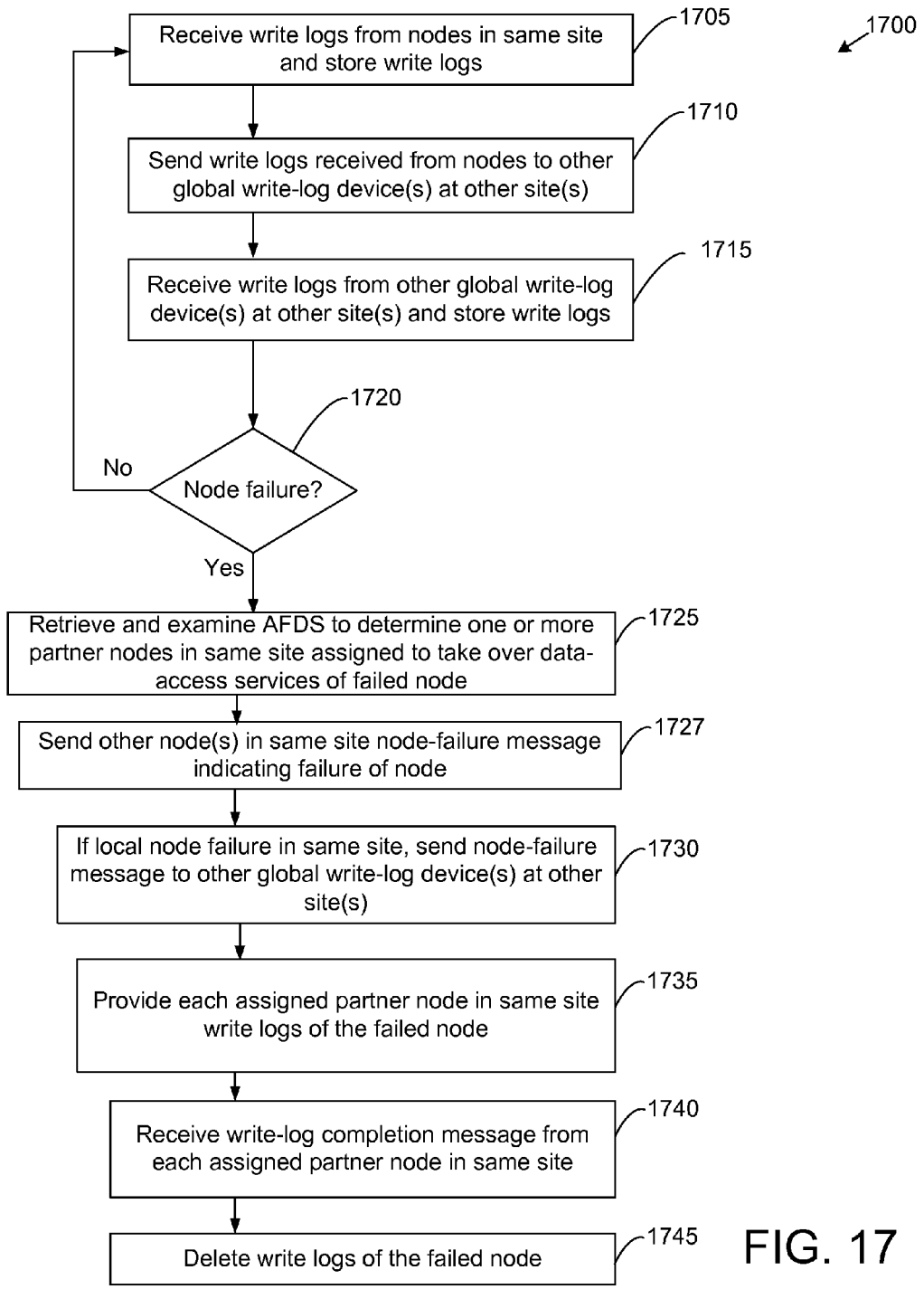
FIG. 17 is a flowchart of a method for managing write logs of a multi-site cluster system 1300.

FIG. 17 is a flowchart of a method 1700 for managing write logs of nodes 200 of a multi-site cluster system 1300 comprising two or more storage sites 1305. In some embodiments, some of the steps of the method 1700 are implemented by software or hardware. In some embodiments, some of the steps of method 1700 are performed by a GWLM module 910 of each global write-log device 905 residing at each site 1305 of the cluster 1300. The order and number of steps of the method 1700 are for illustrative purposes only and, in other embodiments, a different order and/or number of steps are used. Some steps of method 1700 of FIG. 17 may be similar to steps of method 1200 of FIG. 12 and are not discussed in detail here.

The method 1700 begins when a global write-log device 905 at a site receive (at 1705) write logs from one or more nodes 200 in the same site and stores the received write logs. The global write-log device 905 then sends (at 1710) the write logs received from the one or more nodes to one or more other global write-log devices 905 at one or more other sites 1305. The global write-log device 905 then receives (at 1715) write logs one or more other global write-log devices 905 at one or more other sites 1305.

The global write-log device 905 then determines (at 1720) whether a node failure in any of the sites 1305 of the cluster 1300 has occurred. In some embodiments, the global write-log device 905 may determine that a node failure within the same site (referred to as a local node failure) has occurred by monitoring time intervals of when write logs are received from each node. In other embodiments, the global write-log device 905 may determine that a node failure in a different site has occurred (referred to as a remote node failure) by receiving a node-failure message from another global write-log device 905 at another site 1305. In some embodiments, if a node failure has been detected at any site (local or remote), the global write-log devices 905 at all sites will communicate node failure and establish common status of the affected node, and then the node will be declared failed. If a node failure has not been detected, the method 1700 continues at step 1705.

If a node failure has been detected (at 1720—Yes), the global write-log device 905 then retrieves and examines/reads (at step 1725) the AFDS 600 (stored in memory device 915) to determine one or more partner nodes in the same site 1305 that are assigned to take over data-access services of the aggregate set owned by the failed primary node. The global write-log device 905 then sends (at 1727) to one or more other nodes in the same site 1305 a node-failure message indicating the failure of the node (primary node) that initiates/triggers a takeover process of the aggregate set owned by the primary node. If the node failure is a local node failure in the same site, the global write-log device 905 then sends (at 1730) a node-failure message to one or more other global write-log device(s) at one or more other site(s) in the cluster indicating that the primary node has failed. In some embodiments, a node-failure message sent to a node or another global write-log device 905 may include information regarding the aggregate set owned by the failed primary node that is to be taken over and/or information regarding which aggregate sub-set each partner node is to take over (according to the AFDS 600). In some embodiments, the node-failure message may be sent to only those partner nodes assigned to take over an aggregate sub-set of the failed primary node (according to the AFDS 600).

The global write-log device 905 then provides (at 1735) each assigned partner node in the same site 1305 the write logs of the failed primary node (e.g., by allowing the partner nodes to access the storage partition 925 assigned to the failed primary node or by sending the write logs of the failed primary node to each assigned partner node). The global write-log device 905 then receives (at 1740) a write-log completion message from each assigned partner node in the same site indicating that each assigned partner node has performed the write logs of the failed primary node on the shared storage 135. As such, the write logs of the failed primary node are deleted (at 1745) from the storage partition 925 assigned to the failed primary node. The method then ends.

VII. Global Write-Log Device Data Structures and Components

Figure 18:
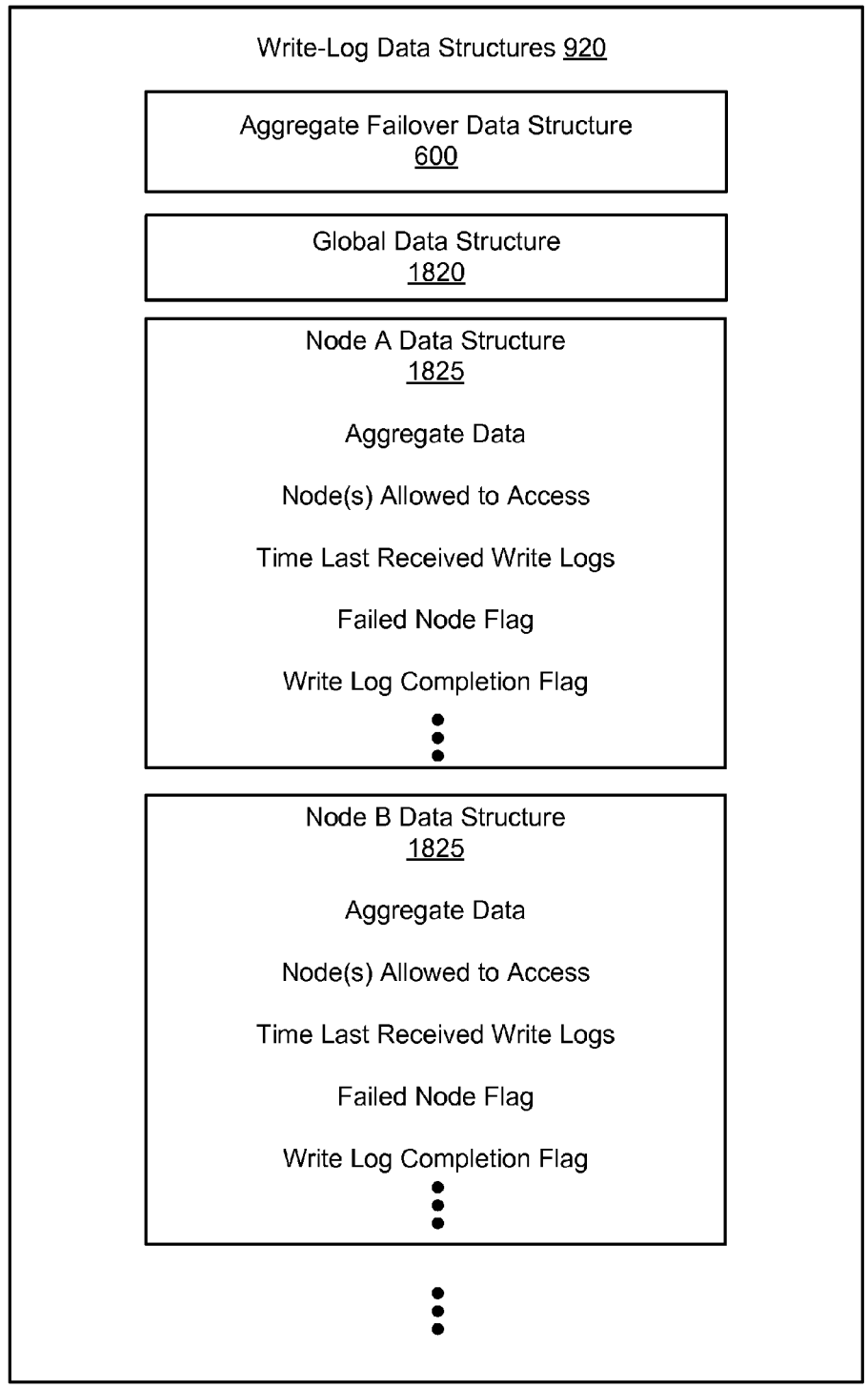
FIG. 18 shows a conceptual diagram of write-log data structures used in a global write-log device for managing the write-logs in a cluster.

FIG. 18 shows a conceptual diagram of write-log data structures 920 used by the GWLM module 910 for managing the write-logs of the nodes 200 in a cluster 100. The write-log data structures 920 may be stored in the memory device 915 of each global write-log device 905 of each storage site 1305. The GWLM module 910 may produce or maintain write-log data structures 920 for storing data used in managing the write-logs of the nodes 200 at each storage site 1305. The write-log data structures 920 may include a copy of the AFDS 600, a global data structure 1820, and a plurality of node data structures 1825, each node data structure 1825 being allocated/assigned for each node 200 in the storage site of the cluster 100.

A node data structure 1825 may be used to collect and store operational and status data (referred to as "node data") about the assigned node 200. Such node data may be stored or updated in the node data structure 1825 by the GWLM module 910 or may be stored or updated directly by the assigned node 200. The node data structure 1825 may be used by the GWLM module 910 for monitoring and managing access to a corresponding storage partition 925 allocated to the assigned node 200.

Node data may include information regarding each aggregate the assigned node currently owns/services (referred to as "aggregate data"). Each node 200 may send data on its assigned aggregates which is logged to the node data structure 1825 and updated if there is a change in its assigned aggregates. Node data may also include information regarding which node(s) are permitted to access the write logs stored in the corresponding storage partition 925. Under normal operating conditions (when no nodes have failed), only the assigned node would be permitted to access the corresponding storage partition 925. If the assigned node has failed, however, each partner node assigned to takeover an aggregate sub-set of the failed node would be permitted to access the corresponding storage partition 925. Such partner nodes would be determined based on the AFDS 600 and be listed in the node data structure 1825 (which the GWLM module 910 may use for controlling access to the corresponding storage partition 925).

Node data may include information (time stamp) of the when write logs were last received from the assigned node. The GWLM module 910 may use the time stamp in the node data structure 1825 to determine whether the assigned node has failed (e.g., by determining whether the predetermined time interval for receiving write-logs has expired). Node data may also include a failed node flag indicating whether it has been determined that the assigned node has failed.

Upon a partner node taking over an aggregate sub-set of the failed node and performing the write logs of the failed node stored in the corresponding storage partition 925, a write-log completion message may be sent to the global write-log device 905. Node data may also include a write-log completion flag indicating that a write-log completion message has been received from each assigned partner node and the write logs of the failed node stored in the corresponding storage partition 925 may be deleted. In other embodiments, the node data structure 1825 stores other operational and status data about the assigned node 200 other than those discussed herein.

The global data structure 1820 may be used to collect and store operational and status data (referred to as "global data") regarding all nodes 200 in the storage site 1305. The global data structure 1820 may be used by the GWLM module 910 for monitoring and managing access to all storage partitions 925 allocated to all nodes. Data in the global data structure 1820 may replicate data contained in the separate node data structures 1825 and be used to transfer/share data between separate node data structures 1825. For example, the global data structure 1820 may contain information (aggregate data) regarding all aggregates owned by all nodes of the storage site 1305, information regarding which node(s) are permitted to access each storage partition 925, information (time stamp) of the when write logs were last received from each node, a failed node flag for each node, etc. As such, if a node data structure 1825 for a primary node contains a node failure flag indicating the primary node has failed, this data is copied to the global data structure 1820 which may then be copied to the other node data structures 1825. Thus, each node data structure 1825 will contain data indicating that the primary node has failed.

Figure 19:
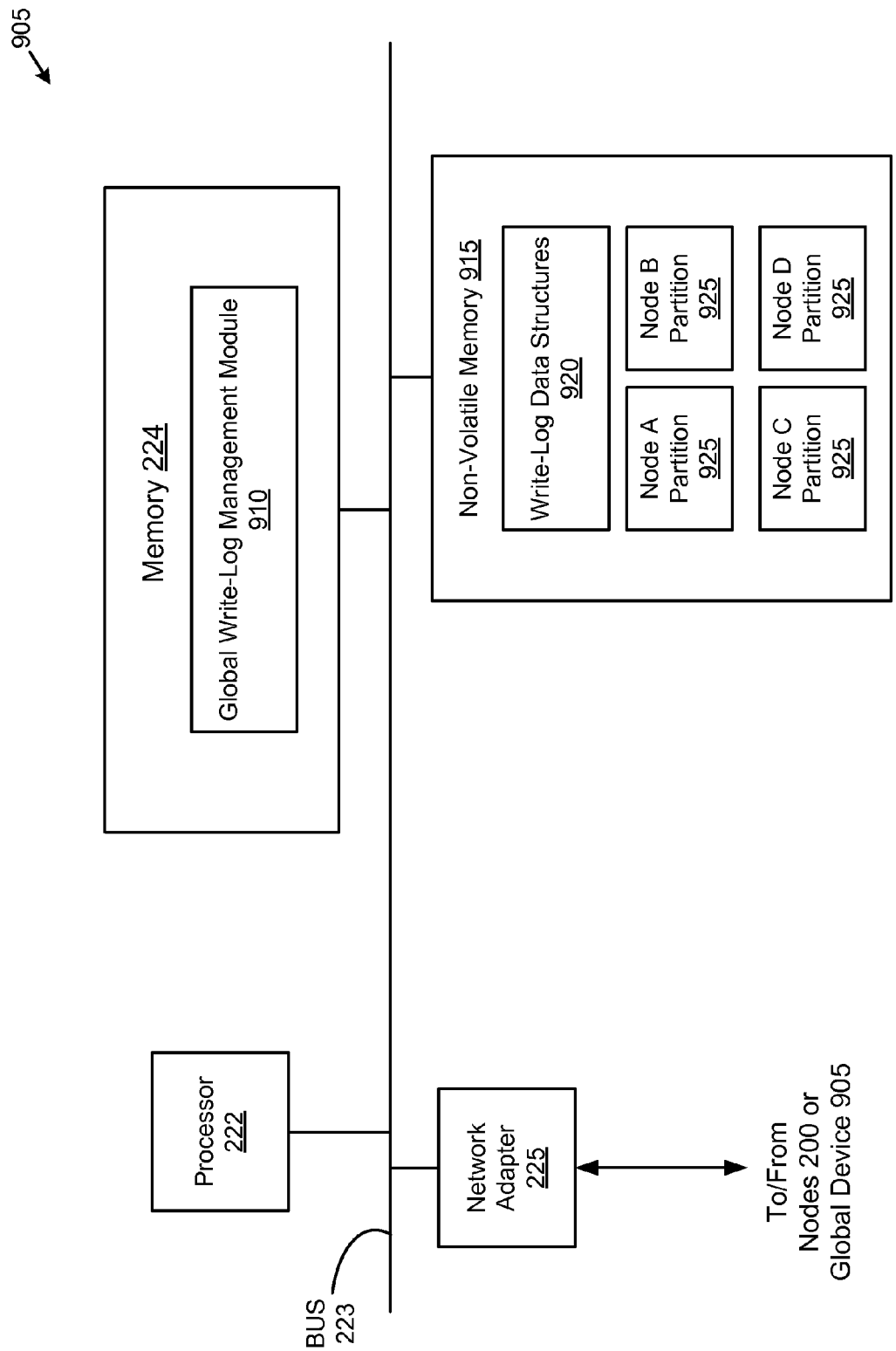
FIG. 19 is a schematic block diagram of components of an exemplary global write-log device.

FIG. 19 is a schematic block diagram of components of an exemplary global write-log device 905. Some components may be similar to components shown in FIG. 2 for the exemplary node 200, and are only described briefly here. A global write-log device 905 may be illustratively embodied as a computer system comprising a processor 222, a memory 224, a network adapter 225, and a non-volatile memory device 915 interconnected by a system bus 223.

The global write-log device 905 is illustratively embodied as a computer system executing the GWLM module 910. The network adapter 225 comprises a plurality of ports adapted to couple the global write-log device 905 to nodes 200 or to another global write-log device 905 over a network 950 or 1310. The memory 224 illustratively comprises storage locations that are addressable by the processors and adapters for storing software program code and data used in some embodiments. The processors and adapters may, in turn, comprise processing elements and/or logic circuitry configured to execute the software code and manipulate the data stored in the memory 224.

Portions of the GWLM module 910 are typically resident in memory and executed by the processor. It will be apparent to those skilled in the art that other processing and memory means, including various computer readable media, may be used for storing and executing program instructions pertaining to embodiments described herein. In some embodiments, the GWLM module 910 may comprise an engine comprising firmware or software and hardware configured to perform embodiments described herein.

The non-volatile memory device 915 may comprise a rewritable computer memory for storing data that does not require power to maintain data/information stored in the computer memory and may be electrically erased and reprogrammed. As discussed above, the non-volatile memory device 915 may store write-log data structures 920 for storing data used in managing write-logs and may be sub-divided into a plurality of logical partitions 925.

In some embodiments, the global write-log device 905 is physically external to each node 200 in the cluster 900 and is configured to operate independently from each node 200. The global write-log device 905 may be configured for maintaining operation upon failure of any node 200 or all nodes 200 in the cluster storage system 900. In some embodiments, each node 200 directly interacts with the global write-log device 905 to perform write-log procedures without requiring any operations of another node 200. In some embodiments, the global write-log device comprises a dedicated computer system configured for the management of the write logs of nodes and is not configured to provide the data-access functions of a node. As such, the global write-log device may comprise a dedicated device that is less prone to operational failure than a node 200.

Some embodiments may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in when executed (e.g., by a processor) perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism utilizing the results of an embodiment. Such software may include without limitation device drivers, operating systems, and user applications. Ultimately, such computer readable media further includes software instructions for performing embodiments described herein. Included in the programming (software) of the general/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, a software module or software layer may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

I claim:

1. A cluster storage system comprising:
a shared storage comprising a plurality of storage devices;
a plurality of nodes connected with the shared storage for providing data-access service to the shared storage, the plurality of nodes comprising a primary node and at least one partner node configured for resuming data-access services of the primary node upon failure of the primary node, each node configured for:
producing write logs for received write requests;
communicating the write logs to a global write-log device at predetermined time intervals; and
the global write-log device connected with the plurality of nodes, the global write-log device configured for:
receiving and storing write logs from each node;
detecting a failure of a node by monitoring time intervals of receiving write logs from a node; and
upon detection of failure of the primary node, providing the write logs of the primary node to the at least one partner node, each node communicating write logs only to the global write-log device, wherein write logs are not communicated between nodes in the cluster storage system and each node does not store write logs of another node in the cluster storage system.

2. The cluster storage system of claim 1, wherein the at least one partner node performs the write logs of the primary node on the shared storage.

3. The cluster storage system of claim 1, wherein detecting the failure of the node by monitoring time intervals of receiving write logs from the node comprises detecting the failure of the node upon not receiving write logs from the node approximately within the predetermined time interval.

4. The cluster storage system of claim 1, wherein:
the global write-log device is configured for operating independently from each node for maintaining operation upon failure of any node or all nodes in the cluster storage system; and
each node directly interacts with the global write-log device without requiring operations of another node.

5. The cluster storage system of claim 1, wherein:
the global write-log device comprises a memory device for storing write logs from each node, the memory device comprising a storage space; and
the global write-log device is further configured for:
sub-dividing the storage space into at least one logical partition, each partition assigned to a node for storing write logs received from the node; and
upon detection of failure of the primary node, providing the write logs from the partition assigned to the primary node to the at least one partner node.

6. The cluster storage system of claim 1, wherein:
the primary node services first and second aggregates in the shared storage;
the global write-log device comprises an aggregate failover data structure (AFDS), the AFDS specifying a first partner node to take over the first aggregate upon failure of the primary node and a second partner node to take over the second aggregate upon failure of the primary node; and
upon detection of failure of the primary node, the global write-log device is further configured for providing the write logs of the primary node to the first and second partner nodes.

7. The cluster storage system of claim 6, wherein:
the first partner node performs write logs on the first aggregate; and
the second partner node performs write logs on the second aggregate.

8. A cluster storage system comprising:
a shared storage comprising a plurality of storage devices;
a plurality of nodes connected with the shared storage for providing data-access service to the shared storage, each node configured for:
producing write logs for received write requests;
communicating the write logs to a global write-log device at predetermined time intervals; and
the global write-log device connected with the plurality of nodes, the global write-log device configured for:
receiving and storing write logs from each node; and
detecting a failure of a node by monitoring time intervals of receiving write logs from a node.

9. The cluster storage system of claim 8, wherein detecting the failure of the node by monitoring time intervals of receiving write logs from the node comprises detecting the failure of the node upon not receiving write logs from the node approximately within the predetermined time interval.

10. The cluster storage system of claim 8, wherein detecting the failure of the node by monitoring time intervals of receiving write logs from the node comprises detecting the failure of the node upon not receiving write logs from the node within a predetermined time period, the predetermined time period being approximately equal to or greater the predetermined time interval.

11. The cluster storage system of claim 8, wherein the cluster storage system does not perform other techniques for detecting a failure of a node.

12. The cluster storage system of claim 8, wherein:
the plurality of nodes comprises a primary node and at least one partner node configured for resuming data-access services of the primary node upon failure of the primary node; and
upon detecting a failure of the primary node, the global write-log device sends a node-failure message indicating the failure of the primary node to the at least one partner node.

13. A cluster storage system comprising:
a shared storage comprising a plurality of storage devices;
a plurality of nodes connected with the shared storage for providing data-access service to the shared storage, the plurality of nodes comprising a primary node and at least one partner node configured for resuming data-access services of the primary node upon failure of the primary node, each node configured for:
producing write logs for received write requests;
communicating the write logs to a global write-log device; and
the global write-log device connected with the plurality of nodes, the global write-log device configured for:
receiving and storing write logs from each node; and
upon detection of failure of the primary node, providing the write logs of the primary node to the at least one partner node, each node communicating write logs only to the global write-log device, wherein write logs are not communicated between nodes in the cluster storage system and each node does not store write logs of another node in the cluster storage system.

14. The cluster storage system of claim 13, wherein the at least one partner node performs the write logs of the primary node on the shared storage.

15. The cluster storage system of claim 13, wherein only upon failure of the primary node, the at least one partner node receives or reads write logs from the global write-log device.

16. The cluster storage system of claim 13, wherein:
the global write-log device is configured for operating independently from each node for maintaining operation upon failure of any node or all nodes in the cluster storage system; and
each node directly interacts with the global write-log device without requiring operations of another node.

17. The cluster storage system of claim 13, wherein:
the global write-log device is not configured for providing data-access service to the shared storage.

18. The cluster storage system of claim 13, wherein:
the global write-log device comprises a memory device for storing write logs from each node, the memory device comprising a storage space; and
the global write-log device is further configured for:
sub-dividing the storage space into at least one logical partition, each partition assigned to a node for storing write logs received from the node; and
upon detection of failure of the primary node, providing the write logs from the partition assigned to the primary node to the at least one partner node.

19. The cluster storage system of claim 13, wherein:
the primary node services first and second aggregates in the shared storage;
the global write-log device comprises an aggregate failover data structure (AFDS), the AFDS specifying a first partner node to take over the first aggregate upon failure of the primary node and a second partner node to take over the second aggregate upon failure of the primary node; and
upon detection of failure of the primary node, the global write-log device is further configured for providing the write logs of the primary node to the first and second partner nodes.

20. The cluster storage system of claim 19, wherein:
the first partner node performs write logs on the first aggregate; and
the second partner node performs write logs on the second aggregate.

* * * * *